(12) United States Patent  (10) Patent No.: US 7,360,728 B2
Rousseau  (45) Date of Patent: Apr. 22, 2008

(54) HAY BALE PROCESSOR

(75) Inventor: Victor Rousseau, 591, Route 259 Sud, Sainte-Monique, Quebec (CA) J0G 1N0

(73) Assignee: Victor Rousseau, Sainte-Monique, Quëbec (CA)

( * ) Notice: Subject to any disclaimer, the term of this patent is extended or adjusted under 35 U.S.C. 154(b) by 184 days.

(21) Appl. No.: 10/542,320

(22) PCT Filed: Jan. 14, 2004

(86) PCT No.: PCT/CA2004/000035

§ 371 (c)(1),
(2), (4) Date: Mar. 2, 2006

(87) PCT Pub. No.: WO2004/062348

PCT Pub. Date: Jul. 29, 2004

(65) Prior Publication Data

US 2006/0255196 A1   Nov. 16, 2006

(30) Foreign Application Priority Data

Jan. 14, 2003   (CA)   .................................... 2416238

(51) Int. Cl.
*B02C 25/00* (2006.01)
(52) U.S. Cl. .................. 241/37; 241/101.8; 241/186.4; 241/605
(58) Field of Classification Search .................. 241/36, 241/37, 605, 186.4, 101.761, 101.8, 73
See application file for complete search history.

(56) References Cited

U.S. PATENT DOCUMENTS 3,966,128 A * 6/1976 Anderson et al. ............. 241/73

(Continued)

*Primary Examiner*—Mark Rosenbaum
(74) *Attorney, Agent, or Firm*—Ogilvy Renault LLP

(57) ABSTRACT

A hay bale processor (10) having a cylindrical rotatable drum (14) adapted to displace a bale of hay (156-157) over a grill (26) which has a plurality of spaced-apart parallel slot openings (27) which are adjustable to define an average fiber cut length. A rotor (28) driven by an electric motor (66-67) has cutting blades (35) projecting through the openings to contact a bottom face (159) of a bale of hay (160) displaced over the grill. The rotor has a driveable shaft (29) secured to a displaceable suspension mechanism (45) to displace the blades (35) in the openings and above the grill a variable distance depending on the resistive load appliA hay bale processor (10) having a cylindrical rotatable drum (14) adapted to displace a bale of hay (156-157) over a grill (26) which has a plurality of spaced-apart parallel slot openings (27) which are adjustable to define an average fiber cut length. A rotor (28) driven by an electric motor (66-67) has cutting blades (35) projecting through the openings to contact a bottom face (159) of a bale of hay (160) displaced over the grill. The rotor has a driveable shaft (29) secured to a displaceable suspension mechanism (45) to displace the blades (35) in the openings and above the grill a variable distance depending on the resistive load applied to the blades of the rotor when a bale of hay is displaced over the grill. The displaceable suspension mechanism (45) is biased upwardly by an air cylinder (50) or air cushion device (280) to maintain a substantially constant pressure on the displaceable suspension such that when the load on the cutting knives of the rotor are subjected to a force exceeding the predetermined pressure of the cylinder the rotor is displaced whereby a substantially constant drive torque is maintained on the electric motor driving the shaft (29) of the rotor (28).

35 Claims, 19 Drawing Sheets

U.S. PATENT DOCUMENTS 4,134,554 A * 1/1979 Morlock ...................... 241/35
4,846,411 A * 7/1989 Herron et al. ........ 241/101.761
5,653,394 A * 8/1997 Bussiere et al. ...... 241/101.742
6,827,304 B2 * 12/2004 Rousseau ..................... 241/73

* cited by examiner

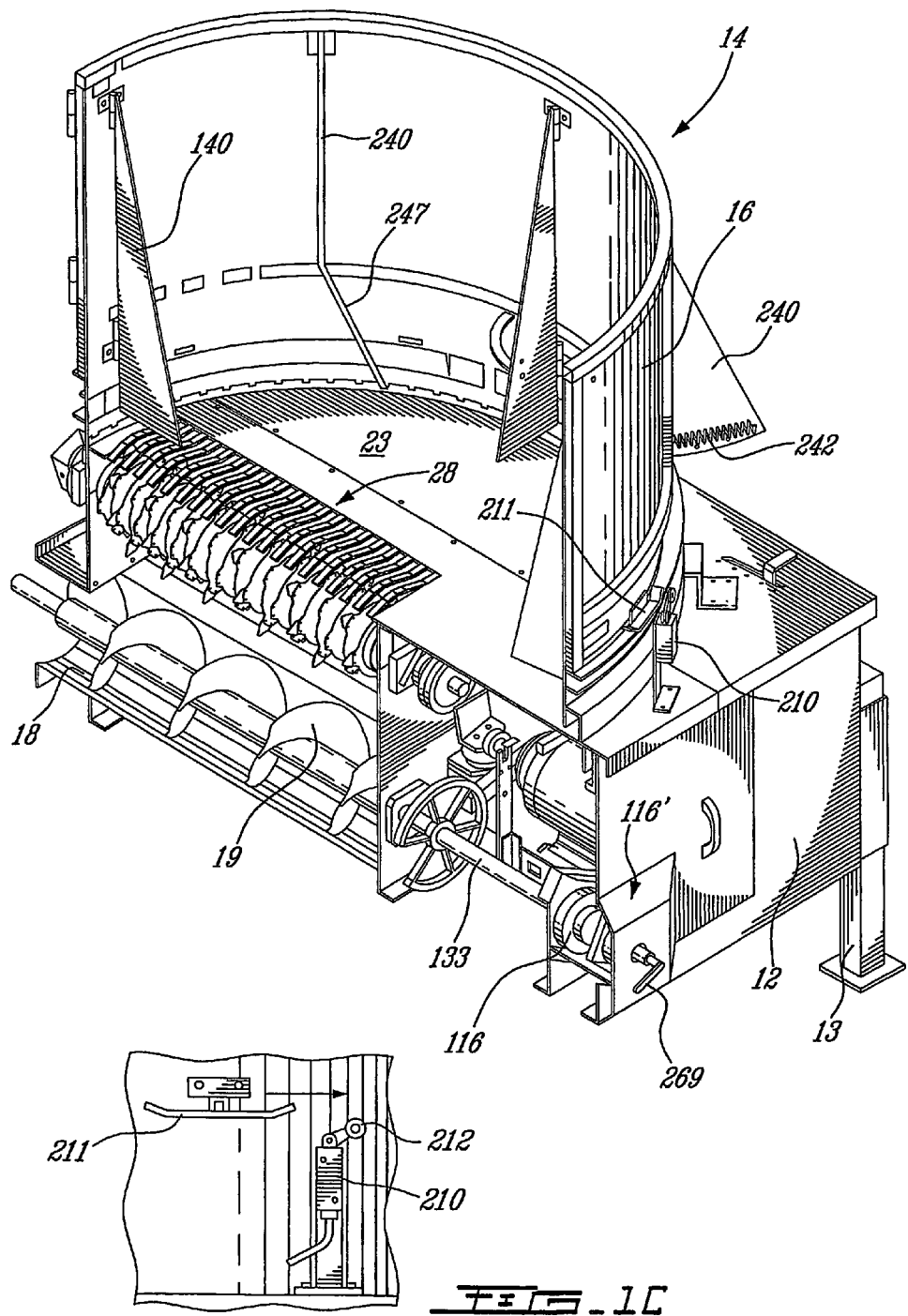

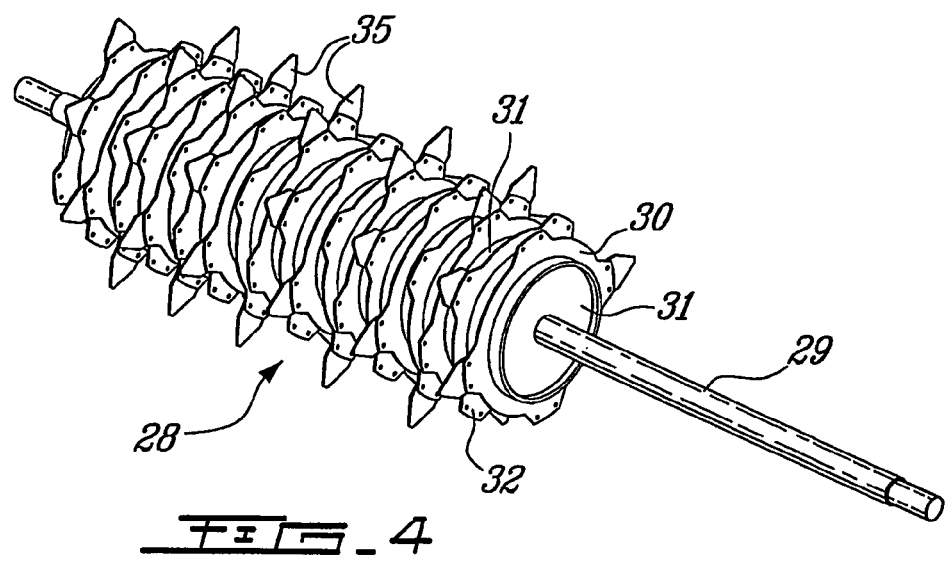
FIG_4
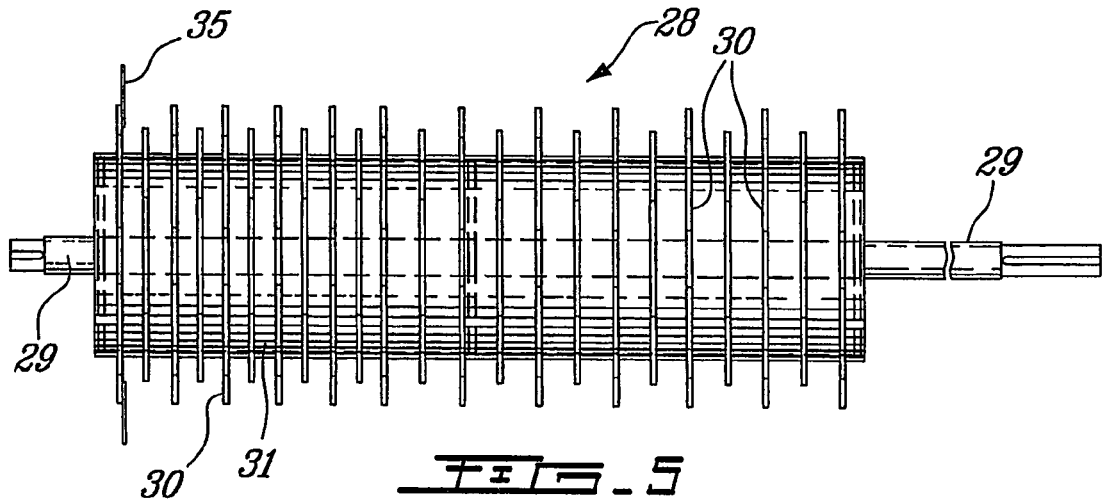
FIG_5
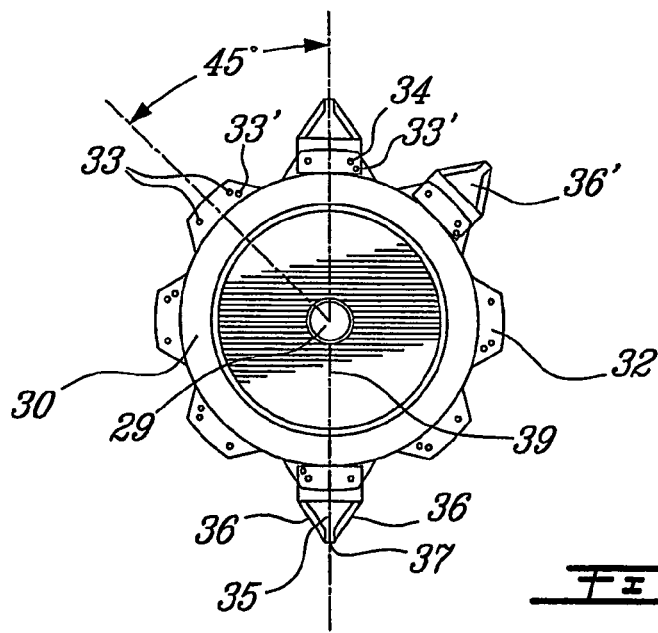
FIG_6

FIG_8

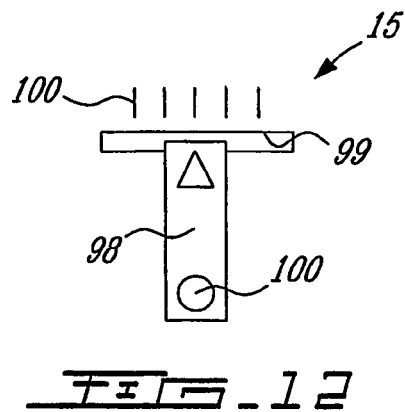
FIG_12
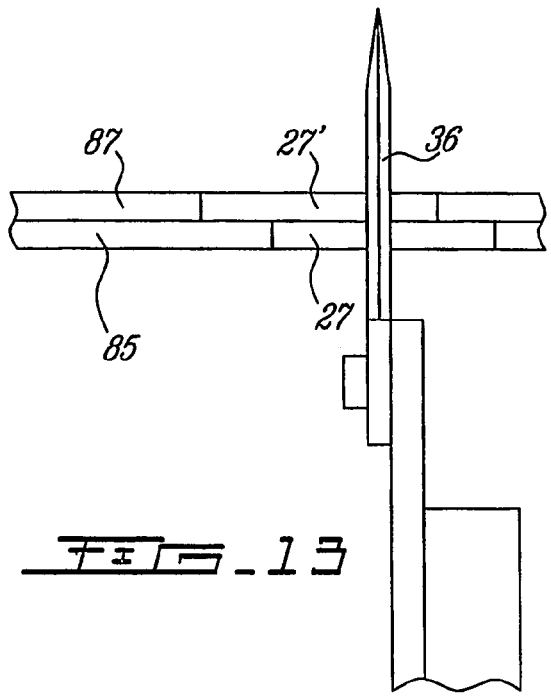
FIG_13
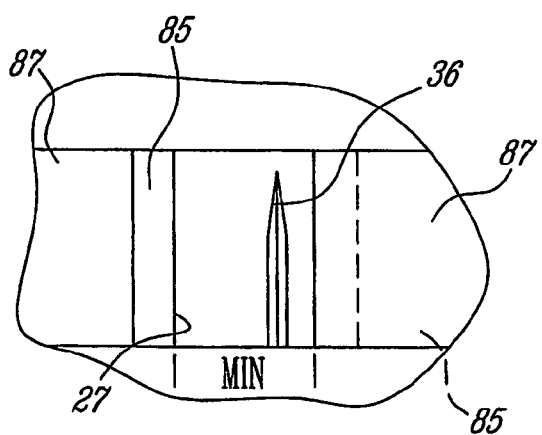
FIG_14A
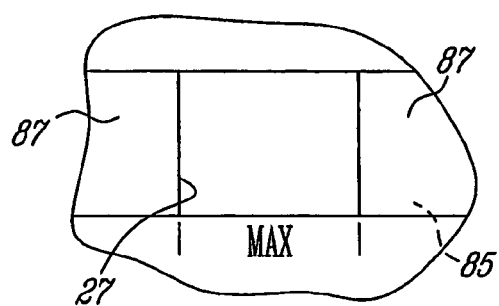
FIG_14B

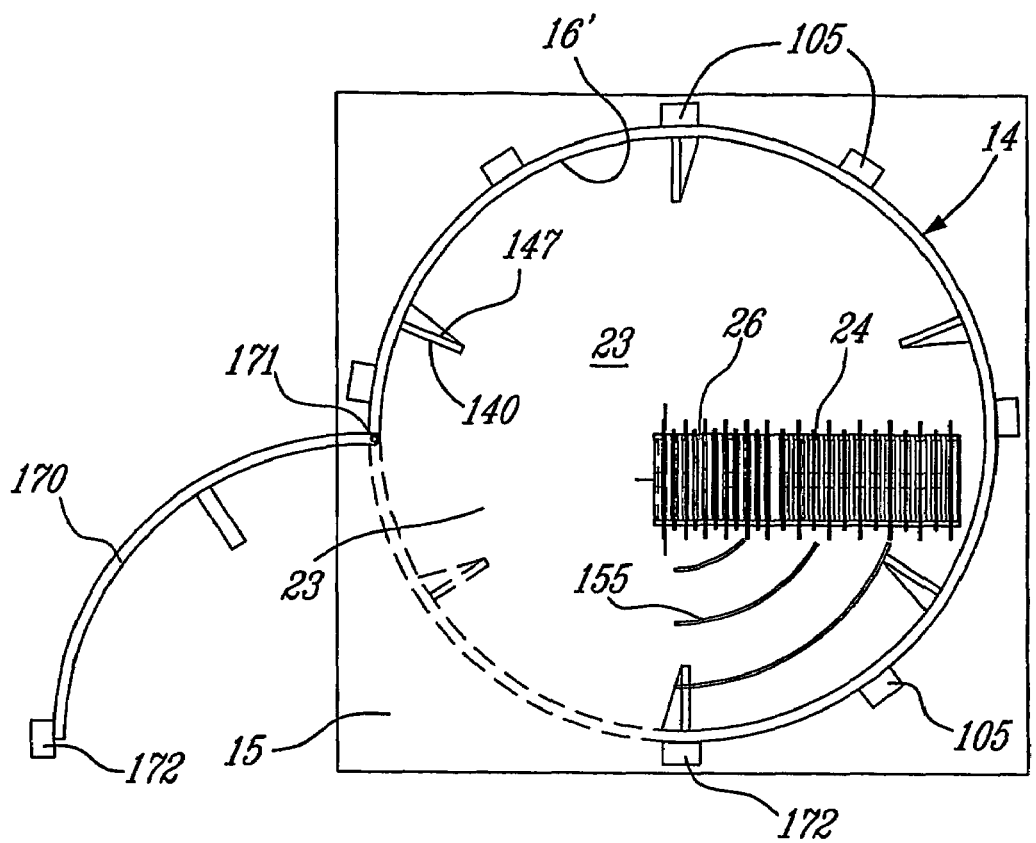
FIG_16
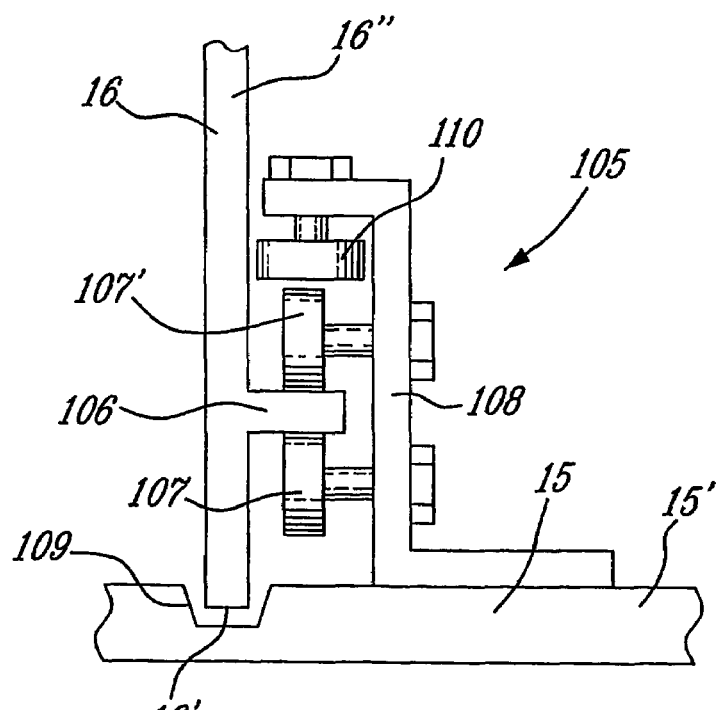
FIG_17

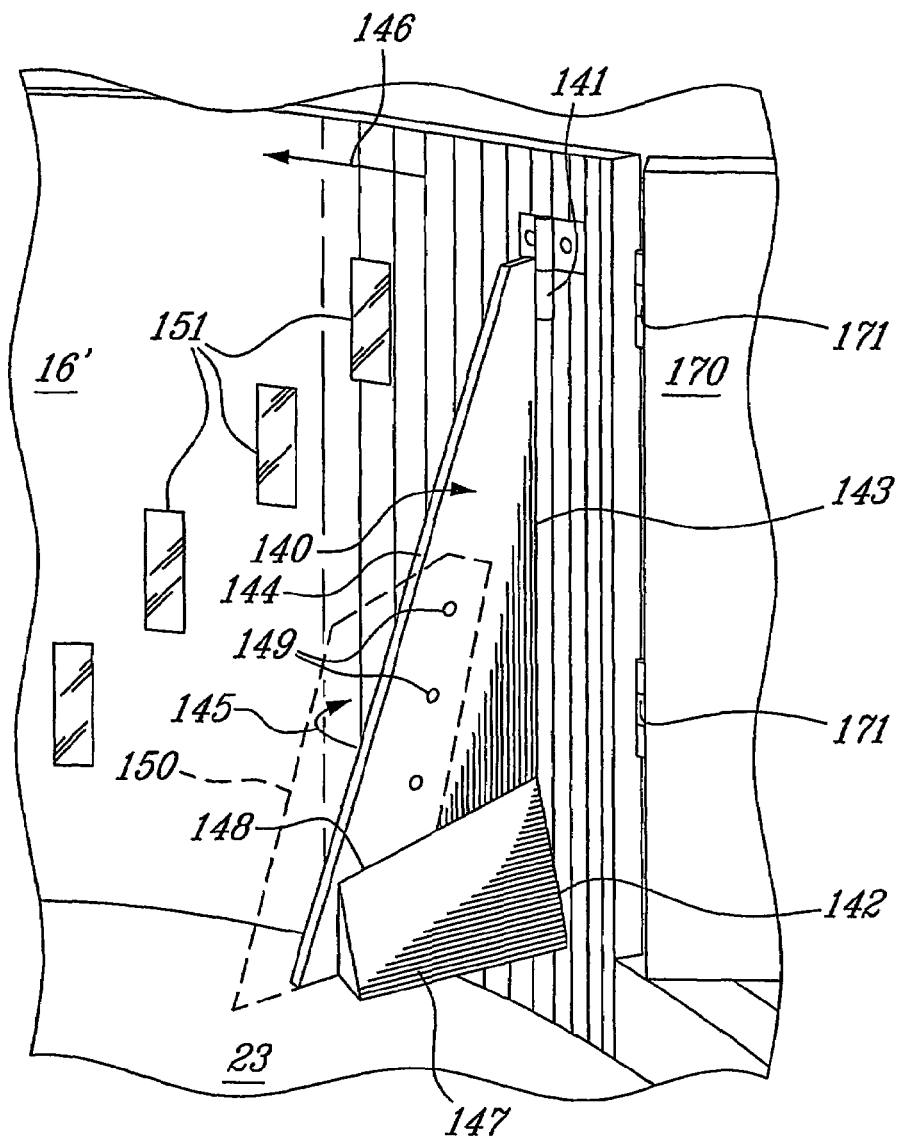
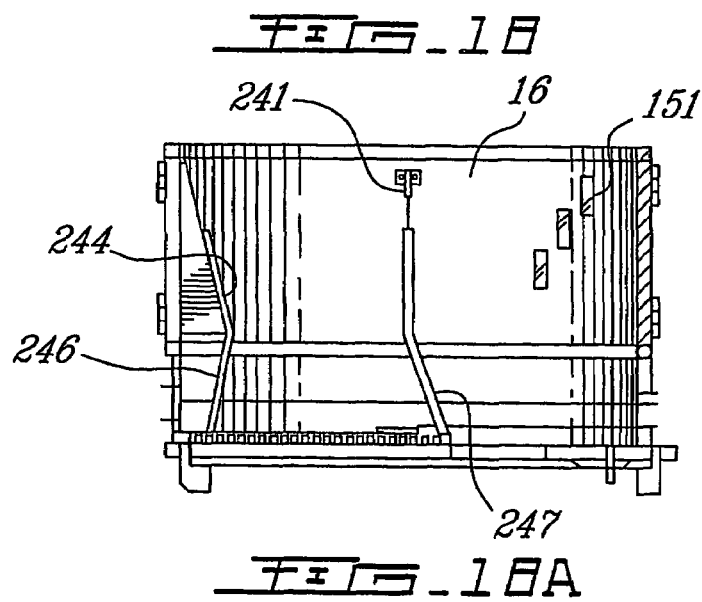

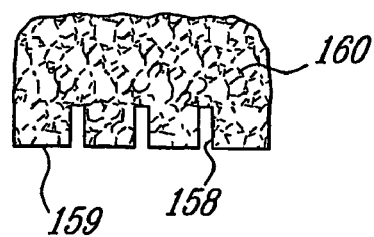
FIG_20
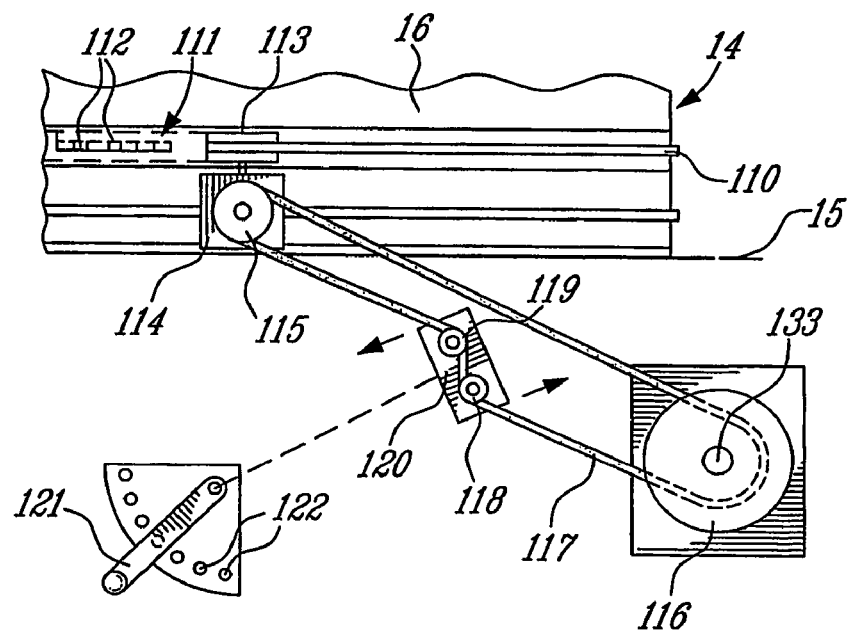
FIG_21
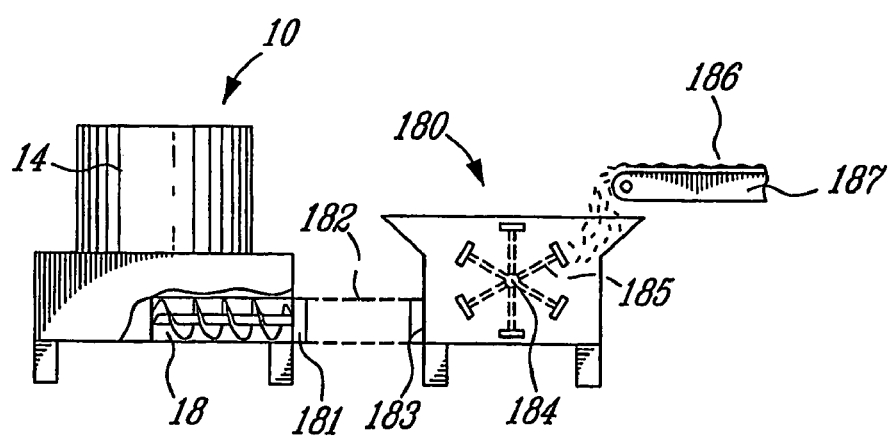
FIG_22

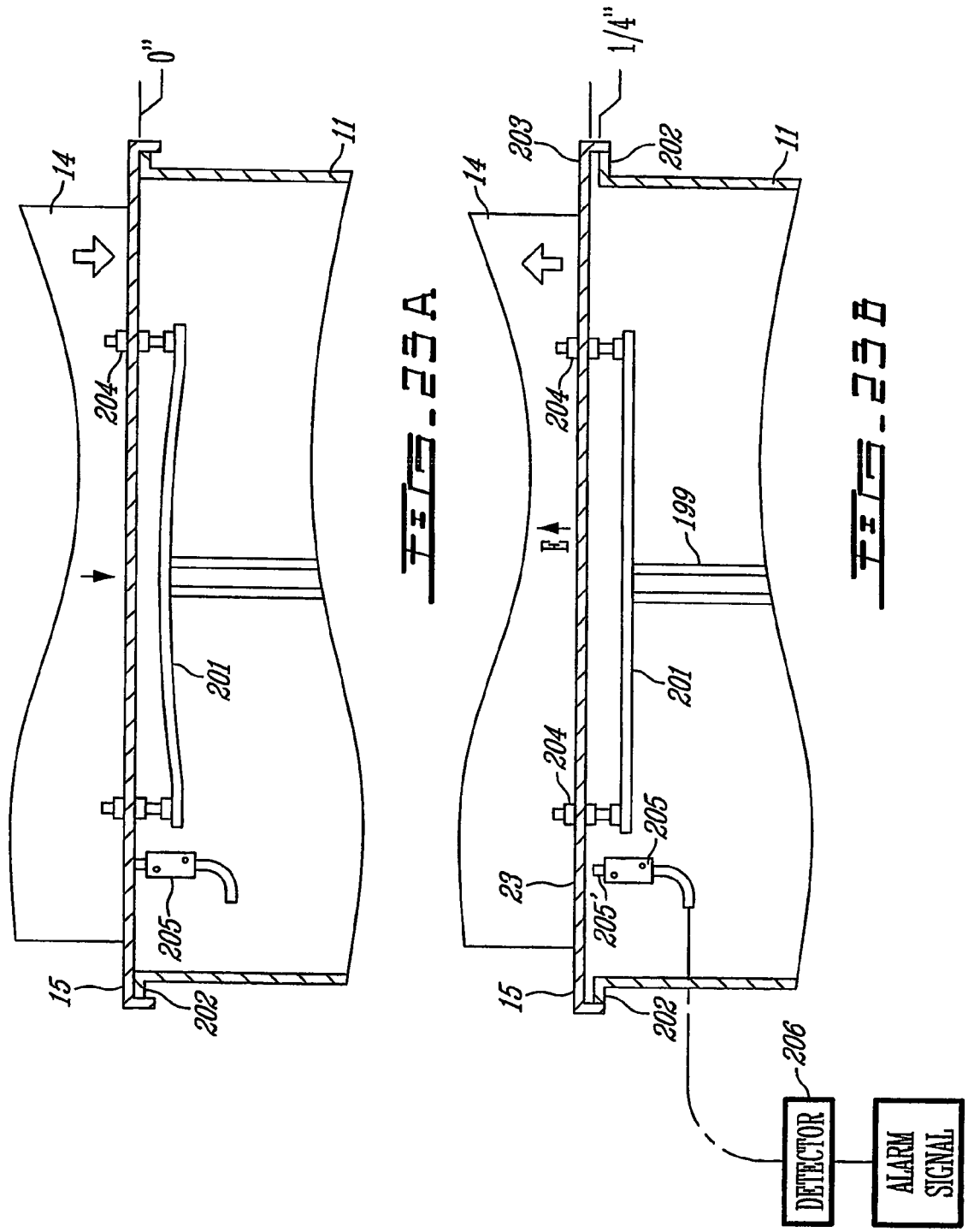

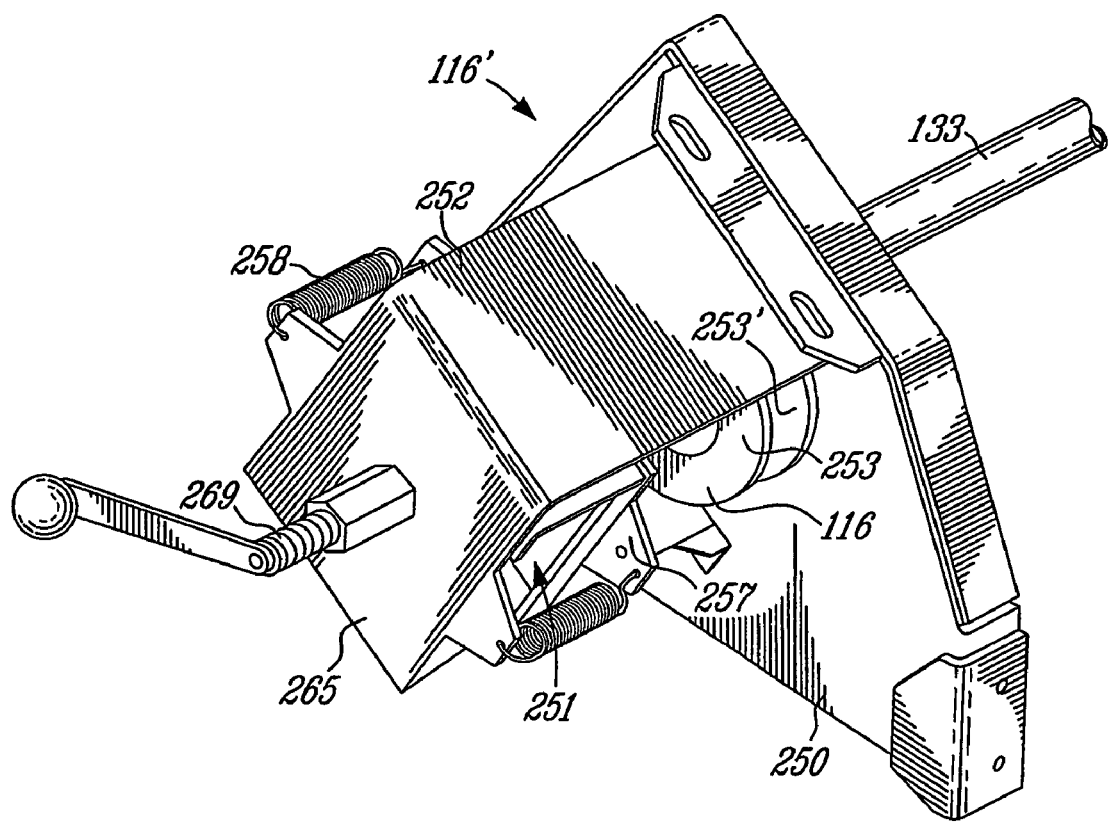
FIG_24

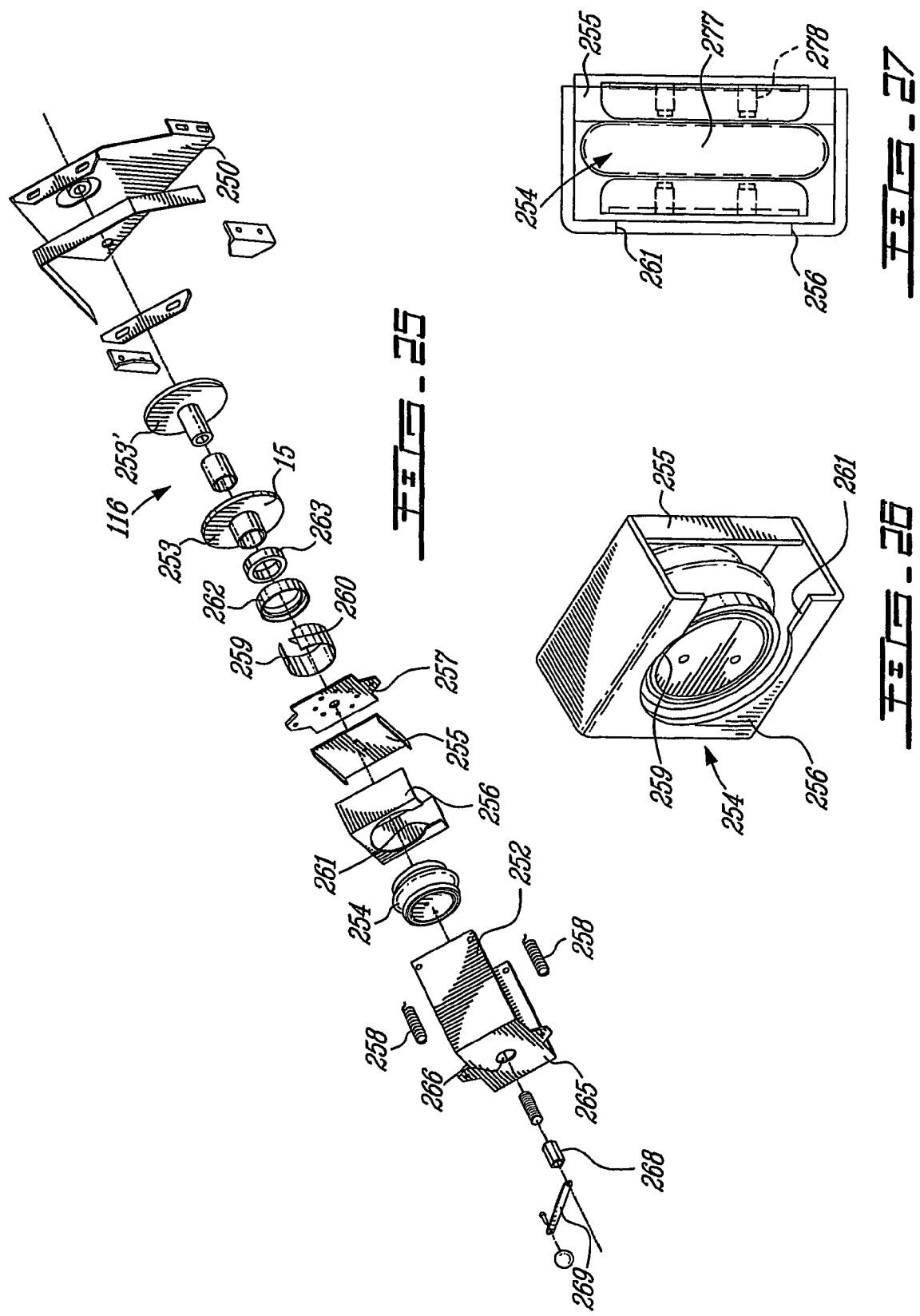

HAY BALE PROCESSOR

FIELD OF THE INVENTION

The present invention relates to a hay bale processor and wherein the rotor is electrically driven and provided with a displaceable suspension mechanism whereby to maintain a substantially constant rotational speed on the rotor and a substantially constant torque on the motor.

BACKGROUND OF THE INVENTION

Various hay bale processors or threshers are known and most of these are driven by the auxiliary drive coupling of tractors. Some of these processors are also driven by electric motors which are coupled directly to the rotor drive of the processors. Bales of hay are fed against the rotor blade either from a horizontal conveyor or from the top of a rotor bin. Some bins are provided with two or more rotors.

With electric motor driven rotors it is known that these motors draw excessive current due to the fact that the load on the rotors is not stable due to the weight of the bales or due to the humidity of the hay in the bales or the type of stock in the bales, thereby offering more resistance to the rotor blades. Consequently, these hay bale processors are expensive to operate.

Another disadvantage with known prior art hay bale processors is that the bales are cut from various angles or locations within the thresher container and this produces hay fibers having different lengths and often excessive lengths. It is known that when mixing hay fibers with other feed stock material that the animals prefer shorter fibers than longer fibers. Shorter fibers are also better for digestion by animals and longer fibers can affect their digestion and therefore the health of the animals. It is therefore important to control the length of the fibers, when cutting hay, in order to improve or at least not to affect the health of the animals.

A still further disadvantage of hay bale processors is that many of these are used solely to trash hay bales and convey the trashed material into a storage pile or storage bins. Known processors also cannot adjust the cut of the fibers within close tolerances whereby to provide an average cut length which is better for admixture with other feed stock material.

Another disadvantage of known hay bale processors is that they are bulky, have hydraulic pumps, need a tractor to operate, are difficult to service, often requiring repair and the knives of the rotor often become gummed and ineffective when cutting hay of the type which has gummy substances.

Another disadvantage of known hay bale processors is that they are dimensioned to accept only certain type and size of bales, i.e. circular or rectangular, and therefore are not versatile whereby to be able to process different size and configuration of bales.

SUMMARY OF THE INVENTION

It is a feature of the present invention to provide a hay bale processor which overcomes all of the above disadvantages of the prior art.

Another feature of the present invention is to provide a hay bale processor having a rotor which is supported on a displaceable suspension mechanism whereby the blades are displaced within slot openings of the grill over which is displaced a bale and wherein the blades may be rotated at a substantially constant speed to cut hay from a lower face of the bale.

Another feature of the present invention is to provide a hay bale processor which is provided with a grill having adjustable slot openings whereby to cut the hay into an average fiber cut length as desired by adjusting the size of the slot openings.

Another feature of the present invention is to provide a hay bale processor wherein the rotor is electrically driven by an electric motor which maintains a substantially constant torque on the driveable shaft of the rotor due to the displaceable suspension mechanism of the rotor.

Another feature of the present invention is to provide a hay bale processor which is easy to service and which can handle bales of various sizes and configuration.

Another feature of the present invention is to provide a hay bale processor which can be coupled to an animal feed mixer.

Another feature of the present invention is to provide a hay bale processor having a rotor with adjustable blade positioning means to orient the blades at different angles to substantially reduce gumming of the cut edge of a blade.

Another feature of the present invention is to provide a hay bale processor having a novel drive for rotating the rotor and a rotatable drum and for hinging the rotatable drum upwardly for servicing.

Another feature of the present invention is to provide a hay bale processor having a rotatable drum which can be rotated at variable speeds and which provides visual access to the interior of the tub during use.

According to the above features, from a broad aspect, the present invention provides a hay bale processor which comprises a container means for receiving a bale of hay to be cut in fibers. A rotor is secured below the container means. The rotor has a plurality of cutting blades disposed about its periphery in spaced-apart parallel relationship. The rotor is aligned with a grill in a bottom wall of the container means and the grill has spaced-apart parallel slot openings defining an average fibre cut length therebetween. The blades are aligned with respective ones of the slot openings and project therethrough to contact a bottom face of a bale of hay displaced over the grill by bale displacement means associated with the container means whereby to cut hay from the bottom face of the bale to produce fibres having an average fibre cut length. The fibres are discharged through the slots and into discharge conveying means. The rotor has a driveable shaft which is secured to a displaceable suspension mechanism to displace the rotor and consequently the knives of the rotor above the grill a variable distance depending on the resistive load applied to the blades of the rotor when a bale of hay is displaced over the grill. Electric motor means is coupled to the driveable shaft for rotating the shaft. The displaceable suspension mechanism has pressure biasing means having a predetermined biasing pressure value. The cutting knives are displaced to retract within the slots when the predetermined biasing pressure value is exceeded by the load of the bale on the cutting blades of the rotor whereby the electric motor means maintains a substantially constant drive torque on the rotor driveable shaft and a substantially constant speed of rotation of the rotor.

BRIEF DESCRIPTION OF THE DRAWINGS

A preferred embodiment of the present invention will now be described with reference to the drawing in which:

FIG. 1B is a fragmented perspective view of the hay bale processor;

FIG. 1C is a schematic view of the micro-switch and activator which cuts out the drum drive;

FIG. 4 is perspective view showing the construction of the rotor and its plurality of knives;

FIG. 5 is a schematic top view of the rotor driveable shaft and the position of its cutting blades;

FIG. 6 is an end view of the rotor showing a feature of its adjustable cutting blades;

FIG. 8 is a perspective view showing the displaceable suspension mechanism at the other end of the support frame and secured above the discharge end of the discharge through;

FIG. 12 is a simplified plan view showing the lever which displaces the actuating arms to adjust the slot openings to produce a desired average fiber cut length;

FIG. 13 is a fragmented cross section view showing a blade projecting through the slot openings and the adjustability of the slide plates to vary the width of the slot openings;

FIGS. 14A and 14B are fragmented top views of the slots showing a minimum slot opening and a maximum slot opening which determine the range of adjustability of the average fiber cut length;

FIG. 16 is a top view showing the circular drum container with a door side wall portion opened;

FIG. 17 is a simplified section view showing an example of the support guide mechanism to support and permit guided rotation of the circular drum;

FIG. 18 is a fragmented perspective view showing the construction and configuration of the hinged bale engaging blades and the sighting apertures provided in the side wall of the drum as well as illustrating the hinge connection of the sidewall door section;

FIG. 18A is a section view illustrating the spring braded blade design;

FIG. 20 is a fragmented section view showing the bottom end of a bale of hay having channels formed therein by cutting blades when the bale of hay is not laterally displaced over the grill;

FIG. 21 is a schematic illustration of the variable drive for the drum gear box drive;

FIG. 22 is a schematic illustration of the hay bale processor of the present invention connected to an animal feed mixer whereby to mix the average fiber cut lengths from the processor with animal feed from a feed line to produce a mix to feed animals;

FIGS. 23A and 23B are simplified section views of the load sensor;

FIG. 24 is a perspective view of the variable drive pulley assembly 116 as shown in FIG. 1B;

FIG. 25 is an exploded view of the variable pulley assembly of FIG. 24;

FIG. 26 is a perspective view of the pneumatic force control cushion;

FIG. 27 is an end view of the pneumatic force control cushion; and

DETAILED DESCRIPTION OF DIFFERENT EMBODIMENTS

Figure 1A:
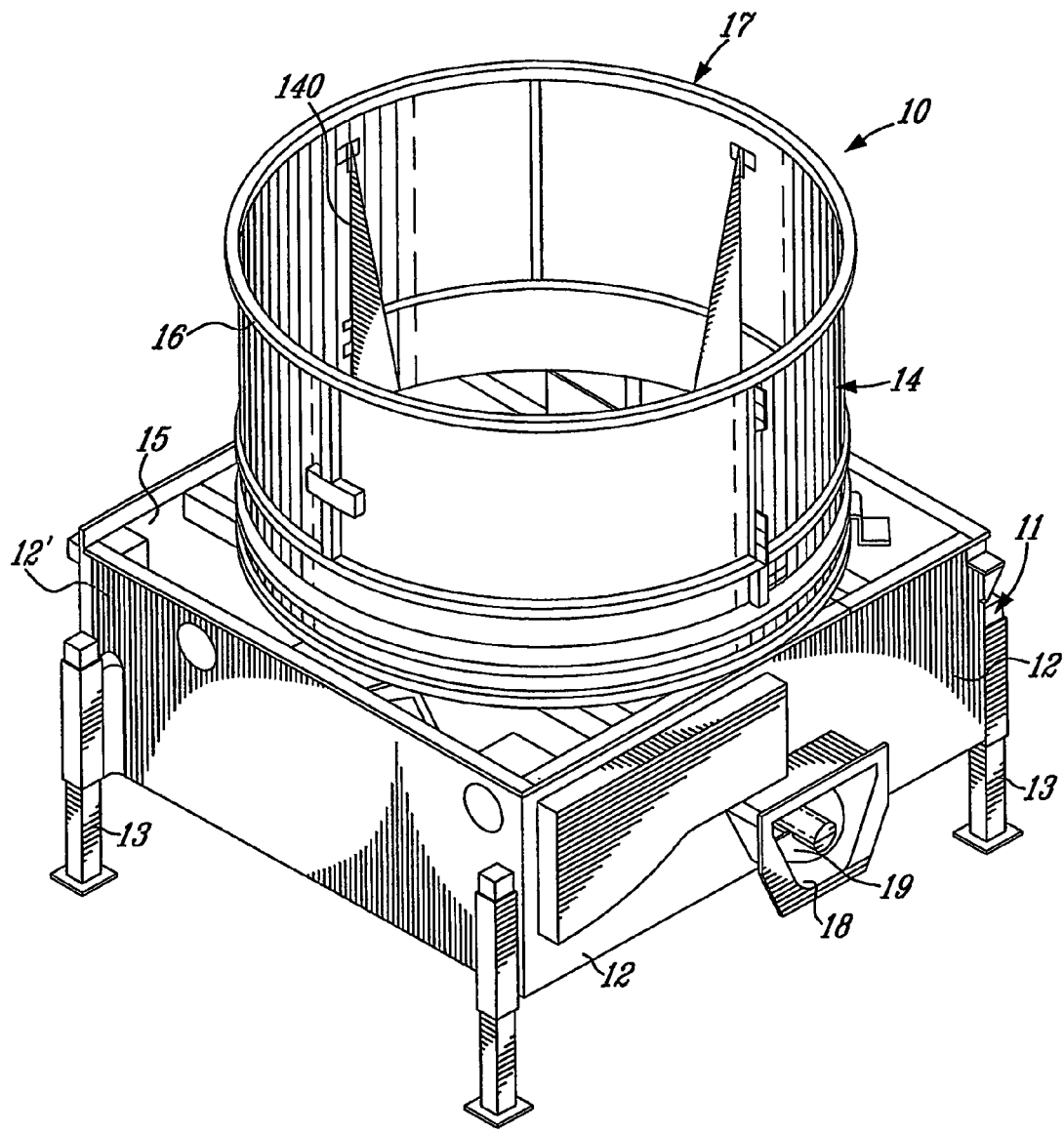
FIG. 1A is a perspective view of the hay bale processor of the present invention.
Figure 2:
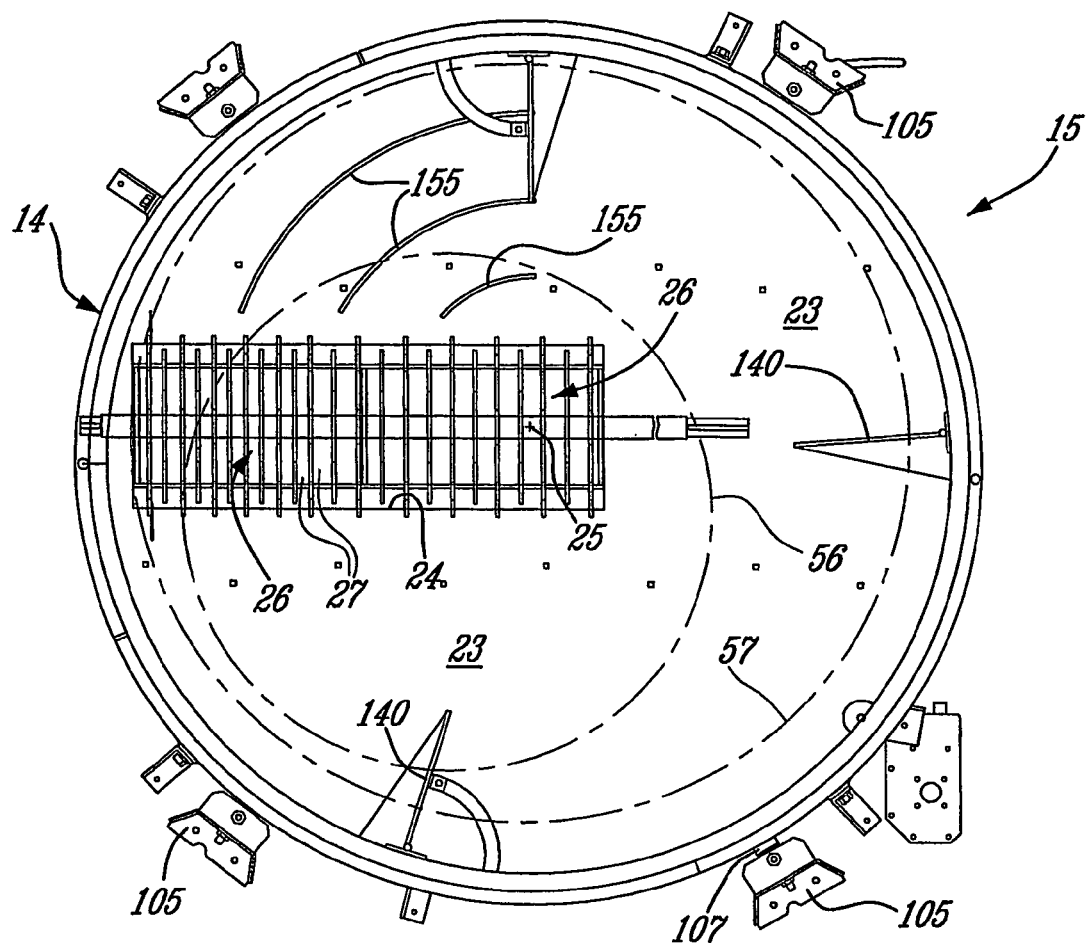
FIG. 2 is a top view of the hay bale processor of FIG. 1.

Referring now to the drawings and more particularly to FIGS. 1A, 1B and 2, there is shown generally at 10 the hay bale processor of the present invention. It consists essentially of a support frame 11 having vertical sidewalls 12 supported elevated on support legs 13. A rotatable circular drum 14 is supported on the top wall 15 of the support frame 11. The circular drum has a cylindrical wall 16 and it constitutes a container means for receiving a bale of hay to be cut in fibres. The bale of hay is a substantially dry hay bale and is loaded from the top open end 17 of the circular rotatable drum 14. A discharge through 18 is secured in a lower portion of the support frame 12 and is provided with a auger screw 19 to discharge cut fibres into a conveying means (not shown) and which can feed the cut fibres into silos or directly into an animal feed mixer or simply to a conveyor to stockpile the cut fibres.

Figure 3:
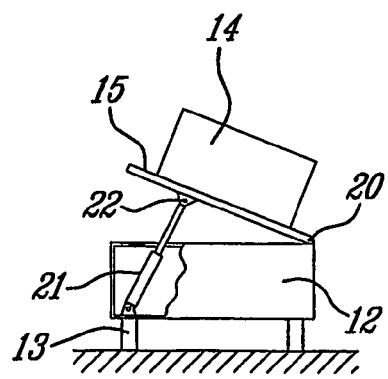
FIG. 3 is a schematic side view showing the rotatable drum hinged upwardly to provide access to the bottom wall of the drum and to the rotor secured to the support frame.

As shown in FIG. 3, the circular drum is secured to the support frame 11 on a hinge 20 and tilted to an open position, as herein shown by an actuatable tilting piston 21 having its piston rod end 22 secured at a desired location under the drum bottom wall.

As shown in FIG. 2, the drum has a bottom wall 23 which is constituted by the top wall 15 hinged on the support frame 11. A rectangular grill opening 24 is disposed in the bottom wall 23 and is offset with respect to the center 25 of the circular bottom wall and extends to one side of the bottom wall and past the center 25 of the drum 14. A grill 26 is disposed in the rectangular grill opening 24 and has a plurality of parallel slot openings 27. The distance between the slot openings 27 defines an average fibre cut length therebetween and the openings are adjustable in width, as will be described later.

With reference now to FIGS. 4 to 6 and 9 there will be described the construction and location of the rotor 28. This rotor is held below the grill and its position is illustrated in the cut out portion of the grill in FIG. 2. As shown in FIGS. 4 to 6 the rotor 28 has a driveable shaft 29 to impart axial rotation to the rotor. A plurality of blade support discs 30 are secured in equidistantly spaced relationship by separator discs 31 in a section of the shaft which is disposed under the grill. The discs 30 are provided with blade attachment shoulders 32 with each shoulder having a pair of spaced holes 33 to receive fasteners 34 whereby to secure a cutting blade 35 thereto.

The cutting blades are flat blades of substantially triangular configuration in at least an upper part thereof and are provided with cutting edges 36 on opposed sides leading to an apex 37. The mounting base 38 of the blades are provided with holes to receive the fasteners 34 to secure same to the blade attaching shoulders 32. Of course the blade could have a single cutting edge on the cutting side of rotation of the rotor. However a double sided edge makes the blade reversible. As shown in FIG. 6 the blade 35, when secured to the pair of holes 33, has its apex 37 substantially aligned with the diametrical axis 39 of the support discs. A further hole 33' is disposed below the trailing one of the pair of holes 33 to secure the blade slanted rearwardly of the diametrical axis as illustrated by reference numeral 36'. Slanting the blades in this fashion is advantageous when cutting crop material which generates gummy substances. By slanting the blade rearwardly, the gummy substance has a tendency of propagating outwardly towards the apex of the blade in an upper portion of the cutting edge due to the blade producing a slicing action. Accordingly, the rotor can be used for a longer period time before it is necessary to clean the blades.

Figure 9:
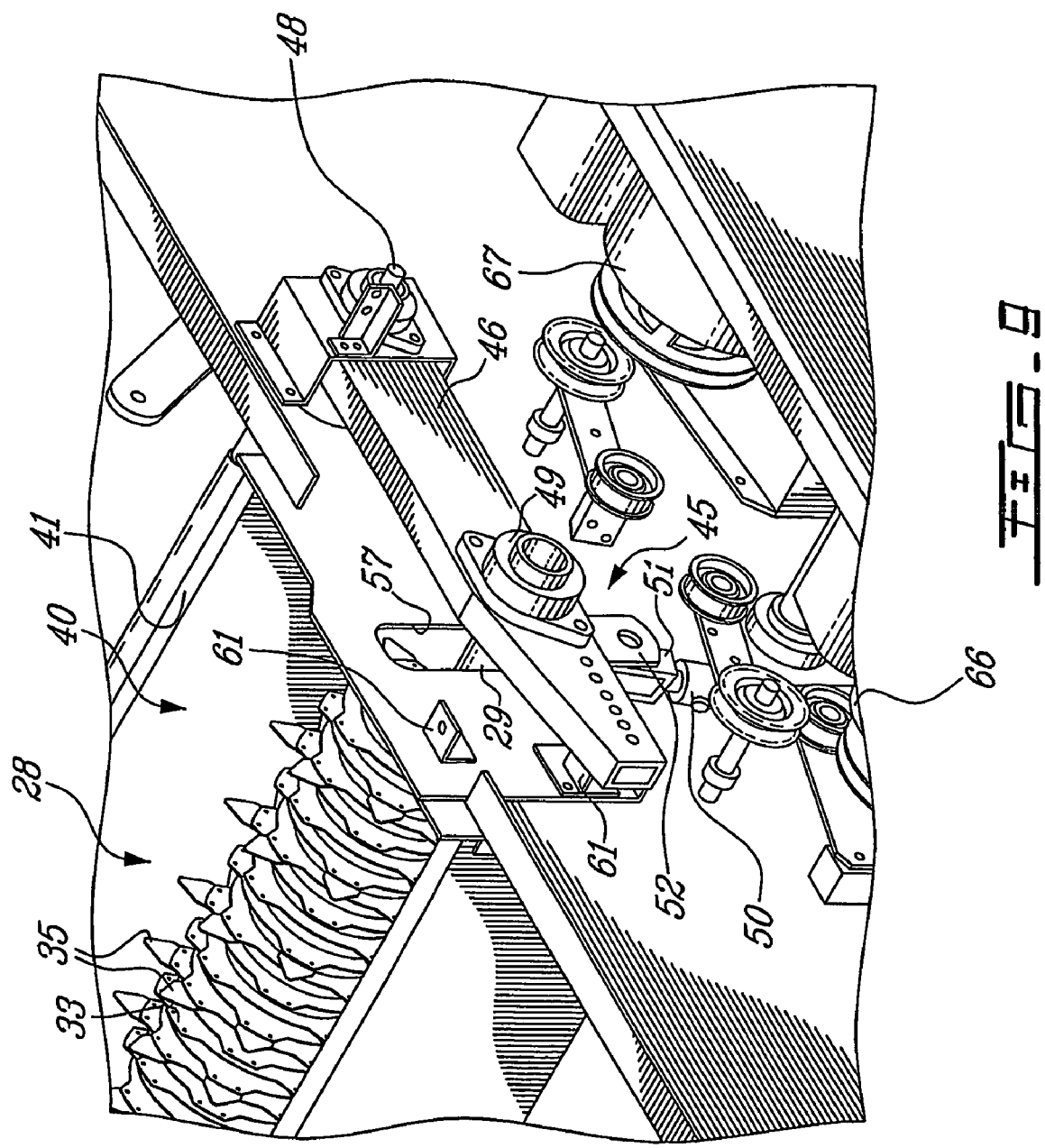
FIG. 9 is an exploded perspective view showing the construction of one of the pivotal arms, the air cylinder connection as well as the drive belt tensioning pulleys and the disposition of the rotor driveable shaft and cutting blades.

As shown in FIG. 9 the rotor 28 is disposed in an upper portion of a through 40 with the grill 26 being disposed over the through 40 whereby cut fibres within an average fibre cut length. The fibers fall through the slot openings 27 and into the through 40 and down into the discharge through 18 to be discharged by the auger screw 19, as illustrated in FIG. 1.

An important feature of the present invention is that the rotor 28 has its driveable shaft 29 secured to a floating or a displaceable suspension mechanism 45 as illustrated in FIGS. 7-10. The displaceable suspension mechanism 45 comprises a pair of pivotal arms 46 and 46' secured respectively to a front vertical sidewall 12' and a rear vertical sidewall 12" of the housing 11. The drive assembly 47 is secured adjacent the front vertical sidewall 12' and each pivotal arm 46 and 46' is secured to its respective vertical sidewall by a fixed pivot connection 48. The driveable shaft 29 is supported in a bushing 49 and 49', respectively, secured to the pivotal arms. An air cylinder 50 has its piston rod end 51 secured to one of the pivotal arm, herein pivotal arm 46, by a pivot connection 52 whereby to apply a substantially constant upward biasing force or pressure on pivotal arm 46. The cylinder is connected to an air reservoir and circuitry as will be described later on, with reference to FIG. 15.

Figure 8:
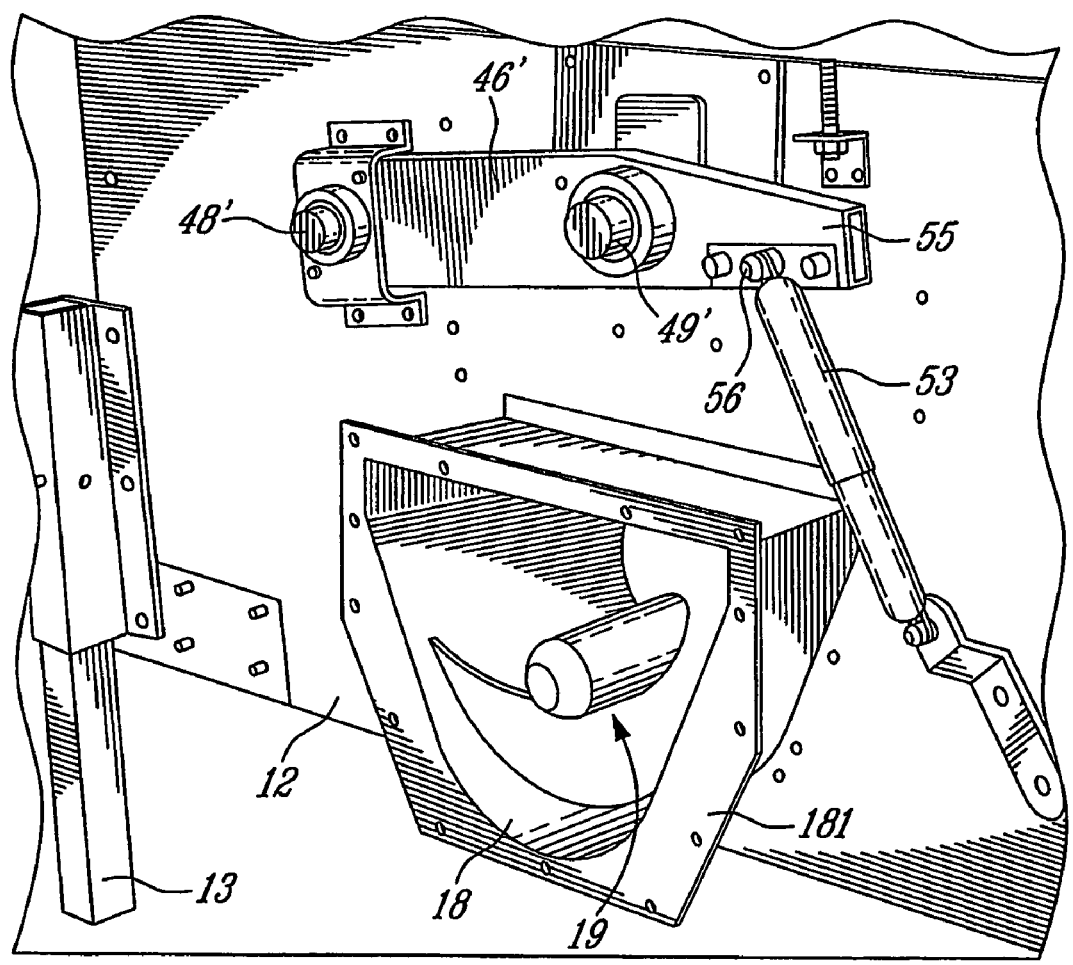

As shown in FIG. 8, the other pivotal arm 46' has a piston 53 secured to its free end 55 through a pivot connection 56 to provide smooth tandem displacement of the pivotal arms 46 and 46' and prevent vibration in the rotor.

The pivotal displacement of the pivotal arms 46 and 46' is limited by an arresting means herein shown in FIG. 9 as a slot 57 formed in the sidewall 12' and through which extends the driveable shaft of the rotor. When the shaft is in the upper part of the slot 57, the cutting blades are outstanding at their maximum distance above the grill. When the displaceable shaft is at the bottom of the slot 57 the blades are retracted below the grill top face.

Figure 7:
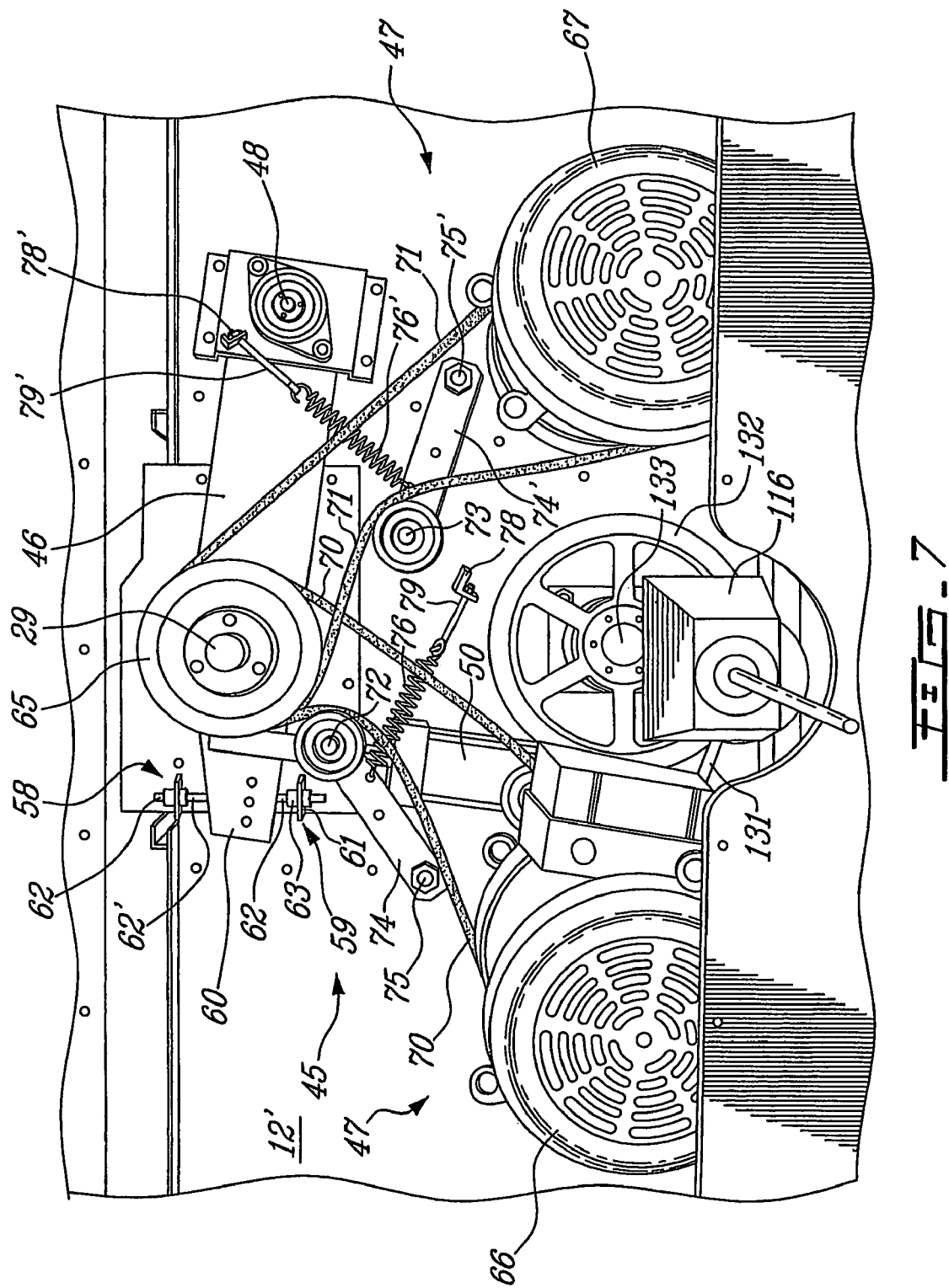
FIG. 7 is an end view illustrating the drive arrangement of the rotor driveable shaft and its securement to a displaceable suspension mechanism.

As shown in FIG. 7, the adjustable arresting means limiting the travel of the pivotal arm may also be constituted by a pair of abutment members 58 and 59 which are positioned spaced-apart from one another and disposed on opposed sides of the free end portion 60 of the arm 46. Of course these abutment members could be secured adjacent the other pivotal arm 46'. At least one of the abutment members is adjustable and as herein shown both members are adjustable and they are constituted by a flange 61 which supports a treaded bolt 62 secured by nuts 63 on opposed sides of the flange 61. Accordingly, the extension portion of the bolt 62 having an end 62' can be adjusted with respect to the adjacent surface of the free end portion 60 of the pivotal arm 46 thereby limiting the travel of the arms which are interconnected through the drivable shaft of the rotor.

As shown in FIG. 7, the drivable shaft 29 is provided adjacent a free end thereof with a driven pulley 65 which is herein constituted as a double sheave which is driven by two motors namely motor 66 and motor 67. However, only one motor may be used depending on the size of the motor and the expected maximum load on the rotor. As shown more clearly in FIG. 10 the motors are each provided with a drive pulley 68 secured to its drive shaft 69 and are connected to the driven pulley 65 by a belt 70 for motor 66 and belt 71 for motor 67. The belts are maintained taut by an automatic adjusting tension means herein constituted by floating pulleys 72 and 73 associated respectively with belt 70 and 71. Each pulley 72 and 73 is mounted on a pivotal arm 74 and 74' which are respectively secured to a pivot 75 and 75' and biased against their respective drive belts by a tension spring 76 and 76', respectively. As herein shown, the springs are secured to brackets 78 and 78' through an adjusting bolt 79 and 79' whereby to adjust the tension against the drive belts.

Figure 15:
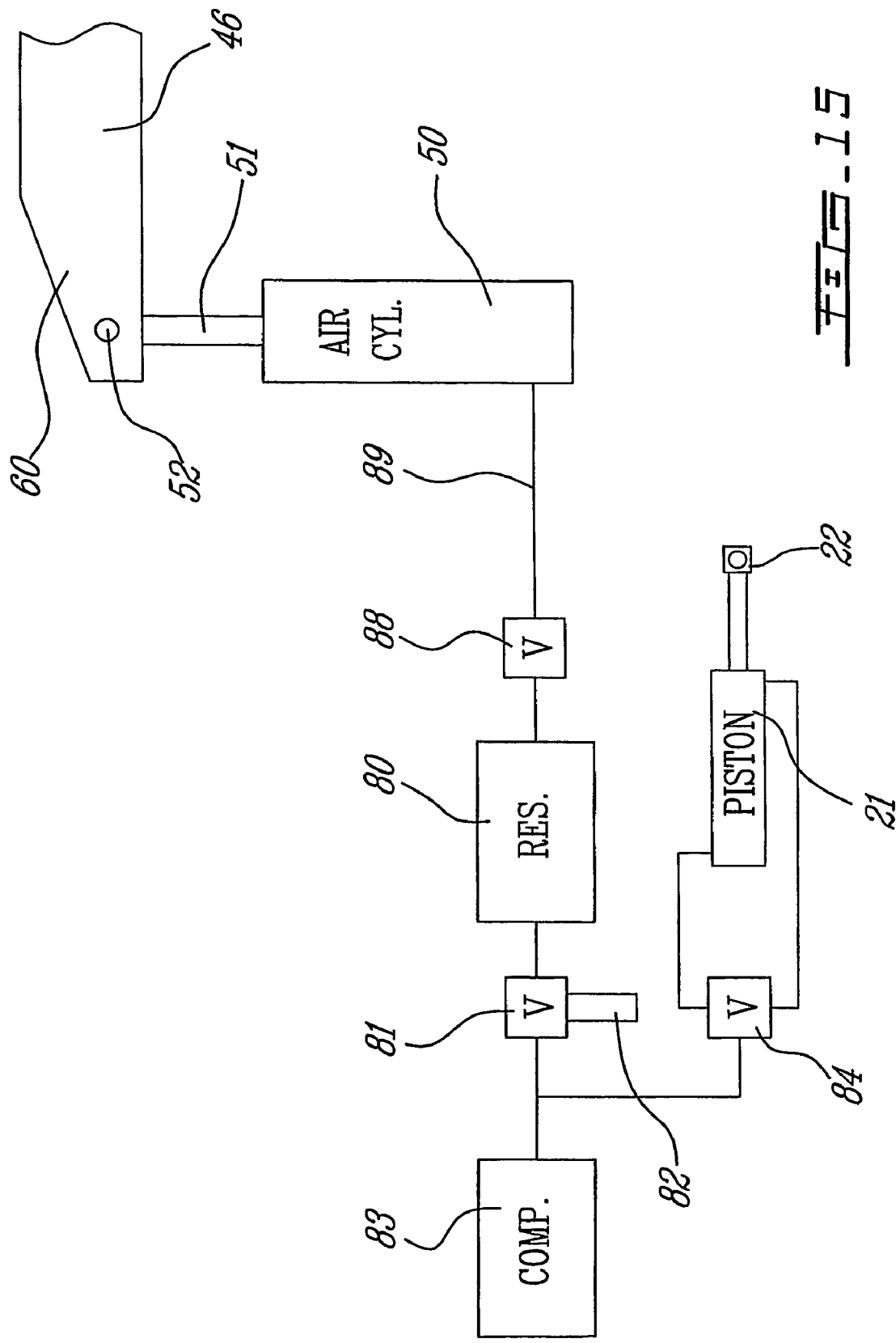
FIG. 15 is a block diagram illustrating the configuration of the air pressure system to operate the cylinder and to operate a lifting piston to lift the drum top section of the processor.

Referring now to FIG. 15, there is shown the air cylinder 50 secured to the pivotal arm 46 and as previously described the cylinder is secured to a constant air pressure reservoir 80. The air pressure in the reservoir 80 is regulated by a pressure regulator 81 which is provided with an adjustment knob 82 to adjust the pressure in the reservoir to a desired value depending on the resistive load to be applied against the rotor cutting blades. A compressor 83 feeds compressed air to the reservoir 80. The air pressure value is also dependent on the rating of the electric motors and the purpose of this air cylinder and upward pressure on the pivotal arm is to maintain a substantially constant drive torque on the driveable shaft 29 of the rotor 28 by the electric motors 66 and 67. Accordingly, the electric motors are not overworked and the rotor cutting blades are maintained rotating at a substantially constant speed regardless on variations of the resistive force applied to the blades by different quality hay bales or by the amount of humidity in the bale or the type of crop material contained in the bale. Assuming that the pressure on cylinder is 32 psi and that there is no bale in the drum, then the blades are biased to their uppermost position by the cylinder 50. When a bale is displaced over the grill and the resistive force exerted by the lower face of the bale onto the blades exceeds 32 psi, it will cause the rotor to move down and the blades to retract a certain amount into the openings of the grill. The pivotal arms will descend and float until the resistive force by the load (the bale of hay) diminishes below 32 psi. Accordingly, the motors are not subjected to loading and maintain a substantially constant torque on the drivable shaft of the rotor and thereby draw a substantially average current from their supply thereby making the system cost efficient and also maintaining the rotor substantially trouble-free as the rotor will not stall in a heavy mass. The load on the blades is dependent of such factors as the difficulty to cut the material (the amount of humidity), the drum speed and the size of the slot openings. "Without the air cylinder the shaft of the motor is stationary and the motors would take the variable load on the rotor".

As shown in FIG. 15 the compressor 83 also drives the piston 21 which lifts the drum 14 from the lower housing 11, as illustrated in FIG. 3. A valve 84 is provided to actuate this piston when it is desired to hinge up the drum for servicing. The purge valve 88 is connected in the air supply conduit 89 leading to the air cylinder 50 whereby to purge the cylinder 50 when the electric motors are shut down.

Figure 11:
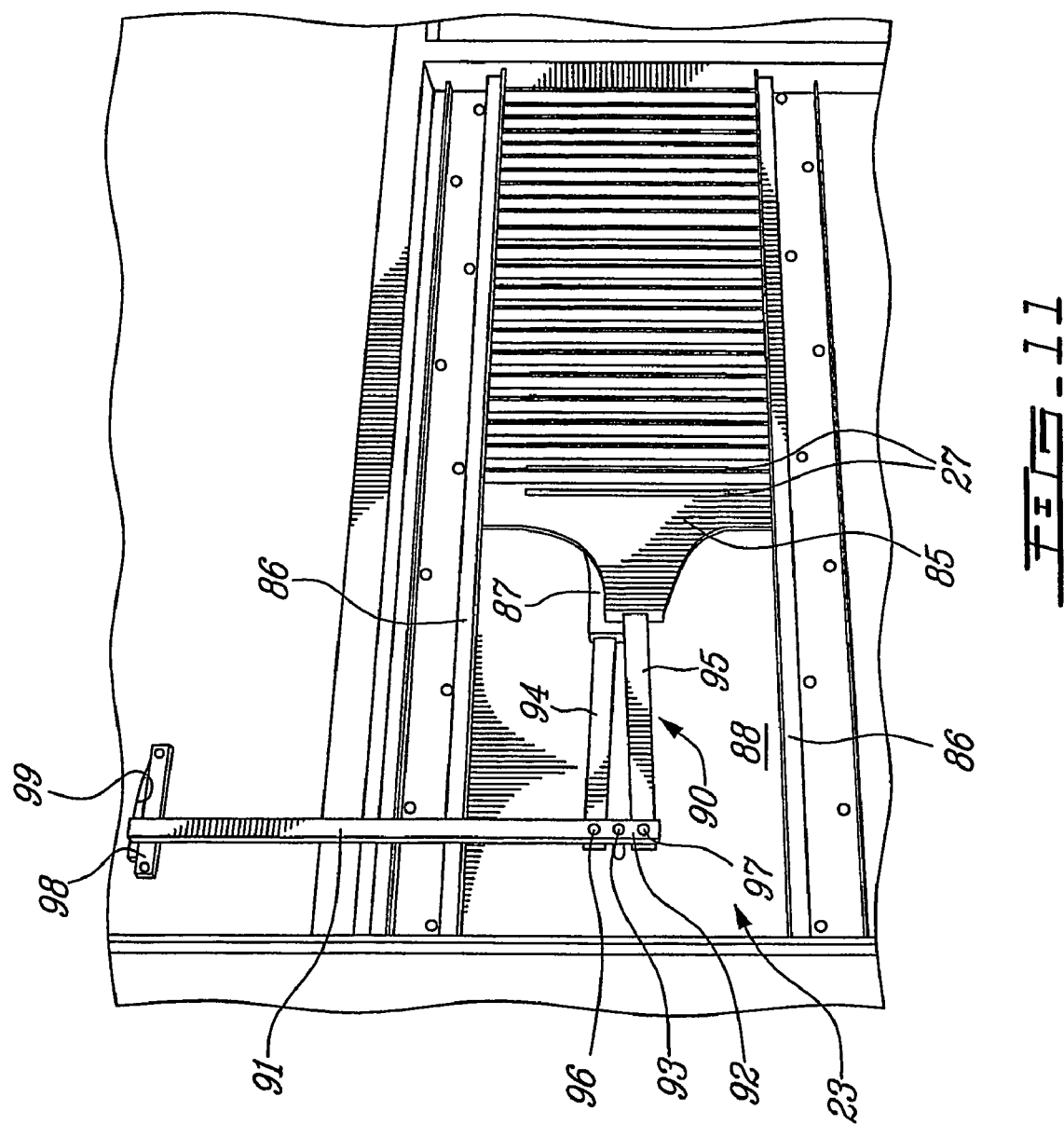
FIG. 11 is a plan view showing the construction of the slotted plates which constitute the adjustable slot openings of the grill and its linkage.

Referring now FIGS. 11-14B there will be described the slot openings adjustment mechanism. As illustrated the slot openings are elongated rectangular slot openings and the width of each slot is adjusted simultaneously by at least one displaceable plate 85, as shown in FIG. 11, which may be displaced over a fixed slotted grill on the bottom wall of the drum. However, in this embodiment the bottom wall 23 of the drum is provided with a rectangular grill opening 24 and under this opening there is supported, in opposed parallel channels 86 and 86', a pair of displaceable slotted plates 85 and 87 which are of rectangular shape and project within the channels along their side edge. Each of the plates has elongated rectangular slot openings 27 and 27' as better illustrated in FIG. 13. Each blade 36 of the rotor extends through an associated slot 27. The width of the slot is adjustable by displacing the plates 85 and 87 in opposite directions. As herein shown the plates are displaceable in frictional sliding contact with one another and with a bottom face 88 of the bottom wall 23.

As the plates are displaced the width of the slots 27 are adjusted and the difference between opposed side edges of the slots determines an average fibre cut length. Accordingly, the fibre length, can be adjusted to have different lengths. FIG. 14A shows a minimum slot opening and wherein the slots 27 and 27' are offset while FIG. 14B shows a maximum slot opening to admit or discharge longer length fibres. Accordingly longer length fibres will pass through the slot 27 in FIG. 14B and shorter length fibres will pass through the slot 27 in FIG. 14A but it is to be understood that when a bale of hay is cut there are slightly longer fibres which can also pass through the slots, and this is why we refer to the cut fibres in this application as "average fibres cut length". The average variation of the length of the fibres is ¾ inch. The fibre cut length adjustment also depends on the speed of rotation of the drum. When the drum speed is low there is more cutting action on the fibers as the rotor has a substantially constant speed. That is to say those knives will slice at the same fibers. Also, when the slots are at their minimum opening it is more difficult for longer fibres to be drawn into the slots and accordingly these longer fibres will be subjected to more cutting action. At higher drum speeds there is less knife cutting action on the fibres and longer cut fibres are produced, but again the slot width size will determine how many times the fibres will be subjected to cutting action before being drawn through the slots. Also, since the grill is offset on the circular bottom wall, the fibre is angulated to the cutting knives and this helps in producing shorter fibre cuts. One has to visualize that these knives are rotating at very high speeds and that several knives act on these cut fibres to produce the desired fibre cut length.

As herein illustrated the displaceable plates 85 and 87 are secured to a displaceable linkage 90 which comprises an actuating arm 91 secured adjacent one end 92 thereof to a stationary pivot 93. A pair of link arms 94 and 95 is secured to a pivot connection 96 and 97 respectively disposed on opposed sides of the pivot connection 93 of the actuating arm 91. The link arms 94 and 95 are secured at their other end to a respective one of the displaceable plates 87 and 85, respectively. The actuating arm 91 has an L-shaped bracket 98 protruding through a slot 99 formed in the bottom wall 23 that protrudes at a convenient location on the top wall 15 to constitute a lever, as shown in FIG. 12 provided with a grasping knob 100 whereby to displace the actuated arm a limited distance about its pivot connection 93. A grid 101 is disposed on the top wall 15 adjacent a slot 99 and indicates the range of the average fibre cut length to permit the user person to select a desired average fibre cut length for his feed stock material.

As shown in FIGS. 16 and 17 the drum 14 has its cylindrical sidewall 16 supported elevated on the top wall 15 and rotatable thereon. Support guide means 105, as shown in FIG. 17 maintains the cylindrical wall 16 in a constant vertical guide plane or circumference. A cylindrical sidewall 16 is provided with a horizontal flange 106 which is in engagement between a pair of guide rollers 107 and 107' secured to a support bracket 108 welded to the top wall 15. As herein shown the lower end 16' of the sidewall is disposed in a circumferential channel 109 but it may be supported or slightly spaced over the top surface 15' of the top wall 15 by these support rolls 107 and 107'. A guide roll also engages the outer surface 16" of the sidewall. Accordingly, this support guide mechanism maintains the drum rotating along a fixed circumference during rotation of the drum.

Referring now to FIG. 21 there is shown a fragmented portion of the drum cylindrical sidewall 16 to illustrate the rotational drive of the drum. As herein shown the drum is driven by an endless belt 110 which is trained about belt engagement means, herein a plurality of belt engaging brackets 111, provided with belt engaging holes 112 to engage the teeth (not shown) formed on the inner side of the belt 110. The belt is trained about a drive pulley or sheave 113 of a gear box 114. The gear box 114 is secured to the top wall 15 and accordingly the drive belt is disposed in a lower part of the drum.

The gear box 114 is provided with a driveable sheave 115 and a variable speed drive connects to this driveable sheave. Variable speed drive is constituted by a variable drive pulley 116 with a variable tension drive belt 117 trained about the variable drive pulley 116 and the driveable sheave 115 of the gear box 114. Drive belt tensioning means is herein constituted by a pair of displaceable sheaves 118 and 119 which are biased against the variable tension drive belt 117 by a linkage 120 herein only schematically illustrated but obvious to a person skilled in the art. The linkage 120 is connected to a control arm 121 which is disposed on the top wall 13 at a convenient location. The control arm 121 is engageable at two or more arm engaging positions 122 with each of the positions applying at different tension on the drive belt to vary the circumference of the variable drive pulley assembly 116 and the speed of rotation of the driveable sheave 115 of the rotor. Accordingly, the drum can be rotated at different speeds dependent on the bale being processed by the processor 10.

Figure 10:
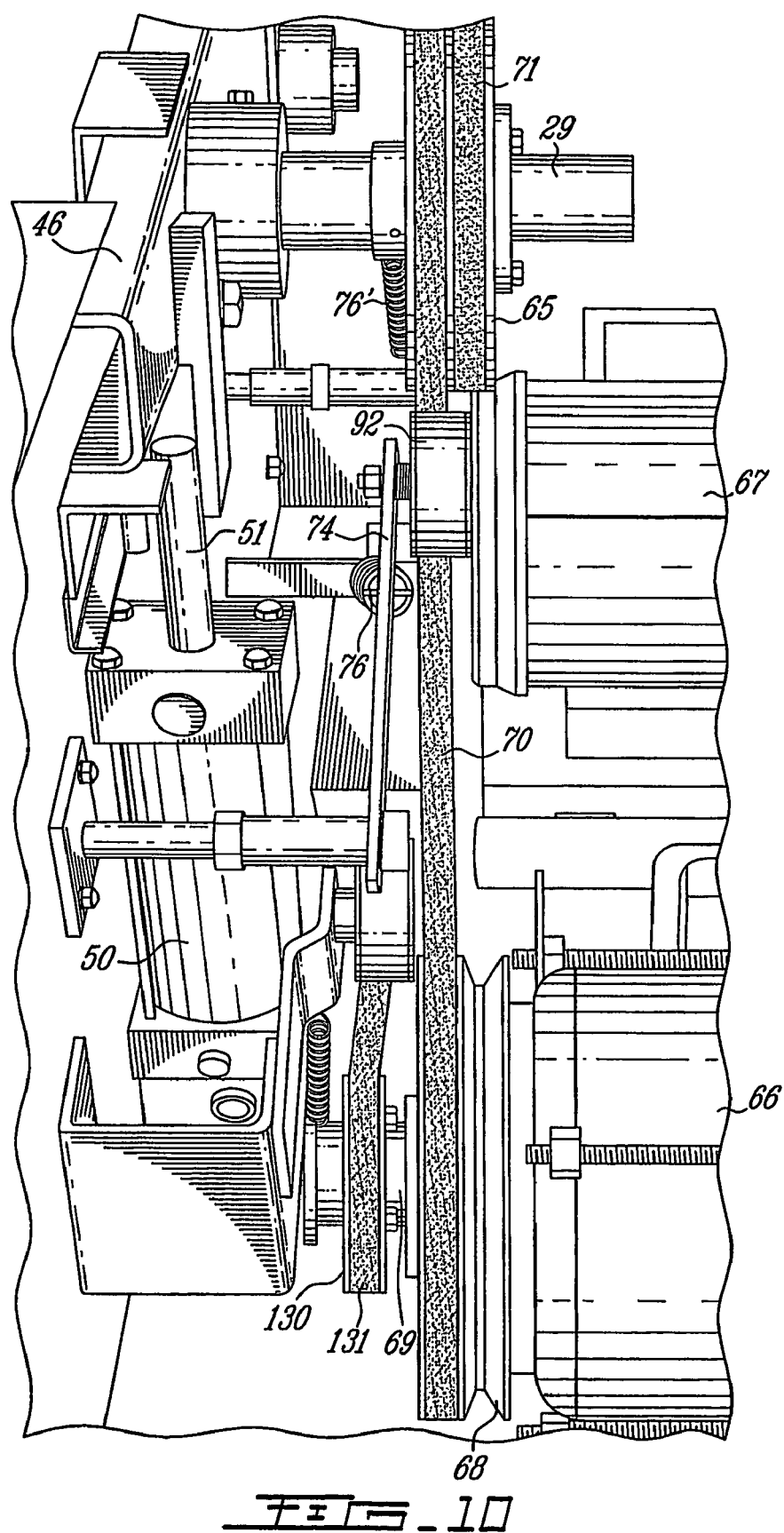
FIG. 10 is a top perspective view showing the auger drive as well as the rotor drive.

As shown in FIG. 10 the motor 66 has a further drive pulley 130 secured to its drive shaft 69. The pulley 130 has an associated drive belt 131 which is trained about an auger screw drive pulley 132 as shown in FIG. 7. That pulley 132 is secured to the drive shaft 133 of the auger screw 19 and extends beyond the sidewall 12' to receive at its end the displaceable pulley assembly 116. Accordingly, the motor 66 drives the driveable shaft of the rotor, drives the auger screw and also rotates the drum.

Referring now to FIGS. 1, 2 and 18A, and 18C, it can be seen that the drum 14 is provided with bale displacement means in the form of vertically hinged bale engaging blades 140 secured to the inner surface 16' of the cylindrical sidewall 16. These blades 140 are secured vertically to the inner wall surface 16' by hinge connections 141 and 142 adjacent opposed ends of the vertical straight edge 143 of the blades. The blades also define a sloped outer edge 144 sloping outwardly and inwards in the drum from a top end to a bottom end as clearly illustrated in FIG. 18. These blades are also displaceable on the hinges 141 and 142 towards the inner wall surface on one side of the hinge when displaced by a bale of hay when inserted in the drum, in the direction of arrow 145. The fins also engage the bale of hay as the drum is rotated in the direction of arrow 146.

Stopper means in the form of an angulated reinforcing plate 147, which is welded to each of the blades at a lower wide end portion 148 thereof, arrest the blades from displacement against an opposed side of the hinges 141 and 142 in the trailing direction of rotation 147. Accordingly, the bale is engaged and brought into rotation with the drum to be displaced over the grill 26.

The blades 140 are also provided with attachment means in the form of holes 149 to permit the attachment of a blade extension plate 150, as herein shown in phantom line, to extend the blade within the drum depending on the type of bale being processed by the processor.

In addition to the blades 140, there is further provided additional blades 240 which are hingedly secured on a hinge connection 241 secured in an upper section of the inner surface of the drum 14. These blades 240 are of triangular shape and extend in a respective slot 16' formed in the sidewall 16 of the drum and biased inwardly into the drum by springs 242. The slots 16' are formed in an upper section of the drum and being pivotal, can engage balls of different size. The blades 240 have an inner edge to which is welded a flat metal bar 244.

The metal bars 244 also extend in a lower section 246' thereof, into a lower section of the drum. The lower section 246 is also bent at a rear angle as shown at 247, trailing the direction of rotation of the drum. This helps in propagating the hay fibers towards the bottom wall 23 of the drum, where springs 242 maintain blade pressure against the bale(s).

Referring now to FIGS. 23A and 23B, there is illustrated schematically the construction and operation of the load sensor mechanism 200. It is comprised of a load sensing blade 201 constructed of spring steel and supported centrally by a support pat 199 under the top wall 15 of the housing, which is the bottom wall 23 of the drum 14. This top wall 15 is biased upwardly of the support flange 202 about the top edge of the housing by the spring blade 201. The space 203 between the top wall 15 and the flange 202 is usually about ¼ of an inch. Adjustment screws 204 adjust this spacing 203 dependent on a desirable load to be sensed in the drum. A micro switch 205 is closed when the wall 15 is lowered when a bale is disposed in the drum, causing the top wall 15 to descend and rest against the contour flange 202.

The switch 205 is connected to a detector device 206 which will indicate that the drum is loaded. In that position, the blade 201 is bent as shown in FIG. 23B, and the switch contact rod 205' is depressed. As soon as the bale is threshed and dispensed in the discharge trough and the quantity of hay is diminishing in the drum, the drum will start lifting and the wall 15 separating from the flange 202. The switch contact rod 205' starts moving outwardly of the switch housing and provides a signal to the detector 206 that a predetermined weight or quantity of hay is still in the drum. The detector 206 provides a suitable signal, visual or audible, to an operator indicating that another bale needs to be inserted in the drum.

Figure 18B:
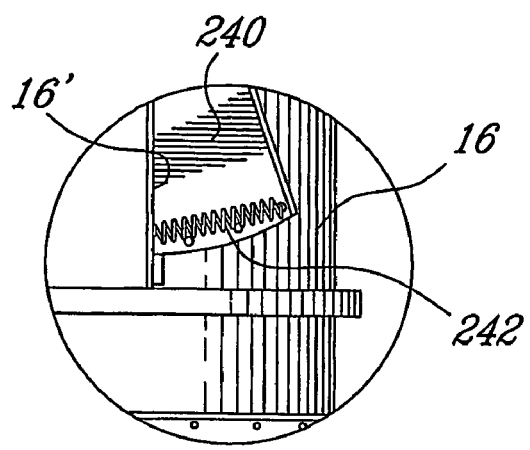
FIG. 18B is an enlarged perspective view showing the spring connection to the blades.
Figure 18C:
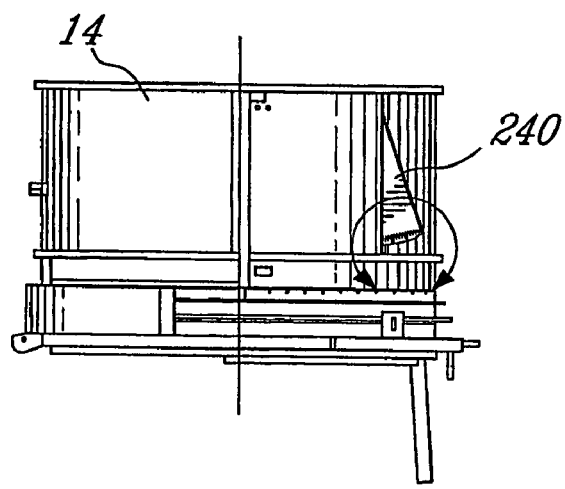
FIG. 18C is an outside view of the drum showing the position of the blades.
Figure 19:
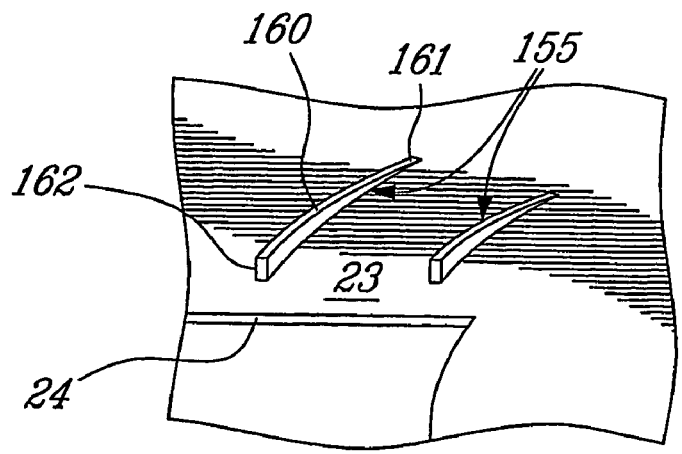
FIG. 19 is a fragmented perspective view showing the construction of the arcuate guide ribs.

As also shown in FIG. 18A sighting windows 151 may be disposed in a staggered fashion in the sidewall 16 at various locations whereby not to weaken the sidewall. These sighting windows provide a user person visibility inside the drum to determine the remaining quantity of the bale being processed. As can be seen from FIGS. 2, 16 and 19 the bottom wall 23 of the drum is provided with at least one arcuate guide rib 155, herein 3 being shown which project upwardly from the top surface of the bottom wall 23. The bottom wall 23 is stationary and part of the top wall 15 as previously described. The arcuate guide ribs are disposed upstream of the grill 26 and their function is to shift the bale, such as bales 156 and 157 being shown in phantom line in FIG. 2, as it becomes displaced over the grill to prevent the formation of cut out channels 158 in the lower surface 159 of a bale 160, as illustrated in FIG. 20. Accordingly, by shifting the bale these channels 158 which are blade cut outs are destroyed and the bale is substantially uniformly cut from its lower surface 159 to produce fibres of an average desired cut length. The arcuate ribs 155 are herein shown disposed substantially in parallel relationship and each other and have a top edge 160 which slopes upward from a front end 161 to a rear end 162 which terminates spaced from the grill opening 24.

Although the drum 14 is circular it is pointed out that rectangular bales can also be processed in the circular drum and displaced by the fins. In FIG. 2 there are two bales illustrated in phantom line, a larger bale 157 and a smaller bale 156. Because the grill extends past the center of the drum circular bottom wall 23, the bale will always be conveyed over the grill and be cut into fibres by the rotor knives. As herein shown the smaller bale 156 is only partly over the grill 26 and therefore there is less resistance on the knives and if the consistency of the hay is very dry and there is very little resistance on the blades they would be fully extended through the slot. However, with large bales 157, if the force on the blades exceeds the set air cylinder pressure, the rotor will descend and maintain a substantially constant rotor speed or cutting blade speed whereby the torque of the motor is maintained substantially constant drawing minimum current.

In order to facilitate maintenance the cylindrical sidewall 16 is provided with a door section 117 which is displaceable on a hinge 171 to provide access to the interior of the drum. Two such doors may also be provided in a side by side relationship. Suitable attachment means 172 is provided to reconnect the door section in a closed position.

In order to provide access to the interior, it is necessary to first stop the drum from rotation when in operation. To do so, as shown in FIGS. 1B and 1C, there is provided a micro switch 210 secured at a predetermined location on the top wall 15 adjacent the drum side wall 16. A switch activating slide 211 is secured to the drum side wall 16 and rotates therewith. Each time the drum makes one rotation, the switch arm 212 is actuated and a signal is sent to a control panel.

When the system is in the "on" cycle, the drum rotates and the switch 210 is not effective. However, when the system is switched to the "off" position, the signal from the switch 210 will immediately stop the drum drive by shutting off the electric motor and urging the pneumatic system, as will be described later. This will stop the drum within a travel of about ¾ inch to position the door 170 of the drum at a precise location as the drum is often loaded through the door passage, either by a forklift truck or conveyor.

As previously described, the drive for the rotation of the drum is provided by a variable drive pulley, as illustrated in FIG. 21. A preferred embodiment of the assembly of that pulley will now be described with reference to FIGS. 24 to 27 and its location is illustrated clearly in FIG. 1B, as identified by reference numeral 116'.

As shown in FIG. 24, the variable pulley is secured to an attachment bracket 250 which is conveniently secured in the housing 12 about the shaft 133, which provides the drive for the variable pulley 116. A pressure biasing assembly 251 is secured to a support bracket 252, which is secured to the attachment bracket 250. The pressure biasing assembly provides biasing pressure against the movable sheave 253 of the variable pulley 116.

With specific reference now to FIG. 25, there is shown an exploded view of the component parts of the pressure biasing assembly 251. As herein shown, the pressure biasing assembly 251 includes a pneumatic force control cushion device 254, which is more clearly illustrated in FIGS. 26 and 27. That device is held captive between a front plate 255 and a back plate 256, which are welded together, as shown in FIGS. 25 and 26. A retention plate 257 is secured between the back plate and the cushion device 234, and connected to the support bracket 252 in tension there against by a pair of springs 258. A spacer tube 259 is welded to the retention plate 257 and projects through the aperture 259 of the back plate. The spacer tube also has a slot 260, which is aligned with the opening 261 of the aperture 259, whereby to permit passage of the cushion device. The spacer tube 259 is received in a bearing housing 262, the other side of which receives the bearing 263 which is disposed against the displaceable sheave 253.

As can be seen, the end wall 265 of the support bracket 252 is provided with a threaded opening 266, whereby to receive a threaded bolt 267 which is secured to a connector 268 fixedly secured to a handle 269, which can be rotated whereby the threaded bolt applies pressure against the front plate 255 to push the cushion device and the spacer tube against the displaceable sheave 253 to control the amount of pressure on the sheave and the speed of rotation of the variable pulley 116.

Figure 28:
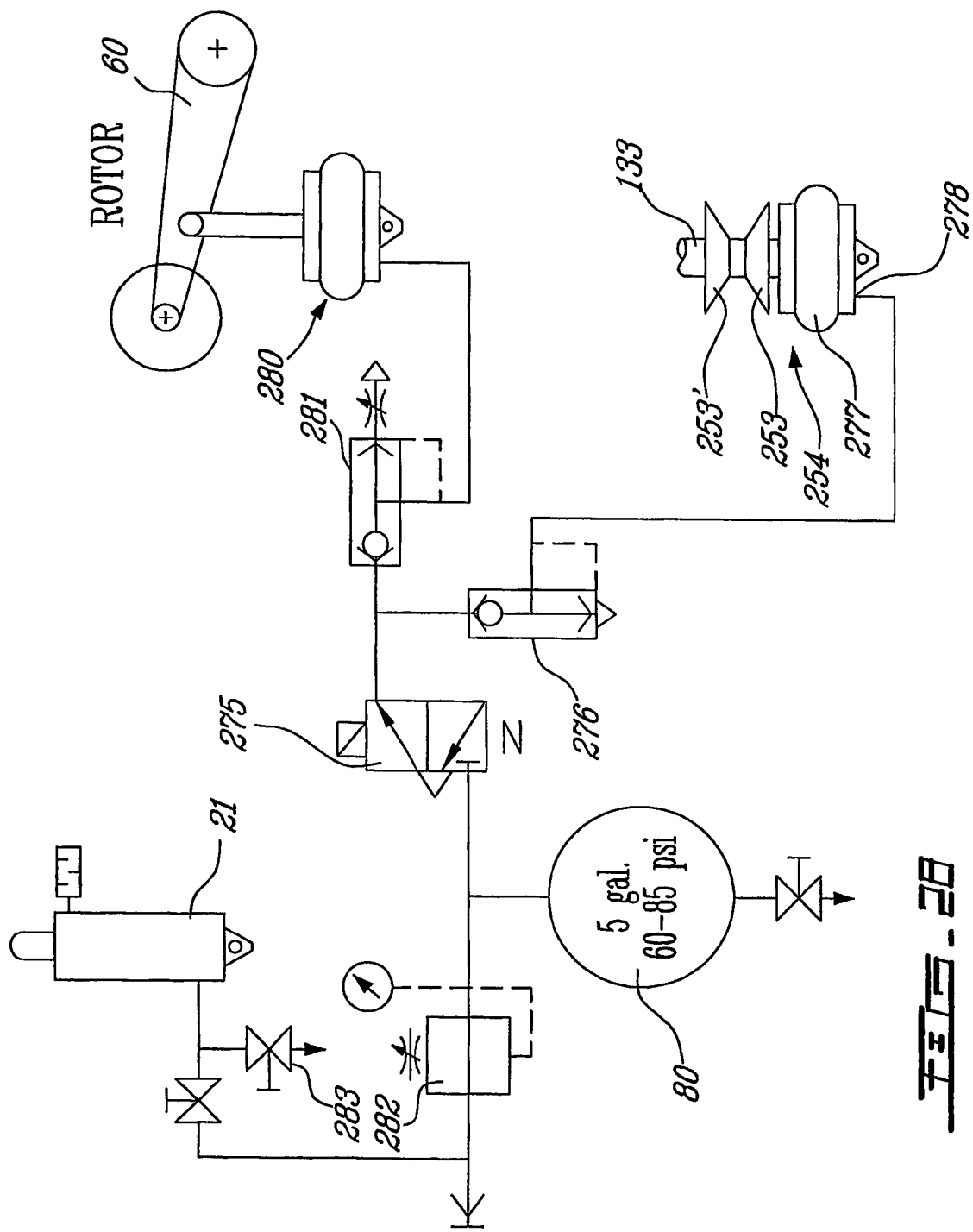
FIG. 28 is a block diagram of the pneumatic system.

During operation, when the drive is actuated through the control whereby to rotate the drum, air is fed to the cushion device whereby to inflate that device and displace the variable sheave 253 whereby to progressively engage the drive belt 117, as shown in FIG. 21. Accordingly, the drum starts rotating slowly and progresses in speed as the variable sheave moves closer to the fixed sheaves on the shaft 133. This pneumatic force control cushion device 254 is connected in the pneumatic circuit, which will now be described with reference to FIG. 28. As shown in FIG. 28, the pneumatic force control cushion device 254 is connected to the air pressure reservoir 80 via a main valve 275 and through a purge valve 276. Air is fed to the flexible body 277 via a port connection 278, and accordingly the body 277 extends when receiving air pressure from the reservoir 80 to progressively bias the variable sheave 253 against the fixed sheave 253'. When it is necessary to stop the rotation of the drum 14, as previously described, the purge valve 276 is opened, purging the circuit and causing the air within the body 277 to be expelled nearly instantaneously, thus stopping the drum fairly abruptly.

In the pneumatic circuit herein illustrated, it can also be seen that the air cylinder 50 has been replaced by a further pneumatic force control cushion device 280. It is constructed in the same manner as the device 254, and it is connected to the air pressure reservoir 80 through a further purge valve 281. When the machine is stopped, the valve 31 purges the device 280 causing the arm 60 supporting the rotor 28 to descend. As herein shown, the piston 21 secured to the hinged top wall 15 is also connected to the pressure reservoir for the actuation of the same through a directional valve 282. A purge valve 283 also permits the piston to be purged whereby to retract the hinged drum, as shown in FIG. 2.

Referring now to FIG. 22 there is shown the hay bale processor 10 of the present invention used in combination with an animal feed mixer 180. The discharge through 18 of the processor 10 is provided with a coupling 181 and a flexible attachment conduit 182 interconnects the discharge port of the discharge through 18 to an inlet port 183 of the animal feed mixer. The conduit 182 replaces a conveyor usually utilized and motor driven. Our flexible conduit does not require a drive, saves space and prevent the release of dust in the air. The mixer is provided with a rotatable shaft 184 to which is connected a plurality of mixing blades 185 which are rotated to mix animal feed products 186 being discharged into mixer 180 by a top conveyor 187 and mixed with the fibres of average cut length from the discharge through of the processor 10. The quantity of fibres of average cut length fed to the mixer can be controlled by the speed of the auger screw and it is synchronized to the speed of the feed conveyor 187. This animal feed mixer has an outlet through (not shown) and it supplies a conveying feed line to convey the mix feed products to animals. On the other hand, the mixer could simply feed other processing equipment to stockpile, bag or otherwise store the mixed animal feed.

It is within the ambit of the present invention to cover any obvious modifications of the preferred embodiment described herein, providing such modifications fall within the scope of the appended claims.

I claim:

1. A hay bale processor 10 comprising container means 14 for receiving a bale of hay 156, 157 to be cut in fibers, a rotor 28 secured below said container means, said rotor having a plurality of cutting blades 35 disposed about its periphery in space-part parallel relationship, said rotor being aligned with a grill 26 in a bottom wall 23 of said container means and said grill having spaced-apart, parallel, slot openings 27 defining an average fiber cut length therebetween, said blades being aligned with respective ones of said slot openings and projecting therethrough to contact a bottom face 159 of a bale 160 of hay displaced over said grill by bale displacement means 140 and 240 associated with said container means whereby to cut hay from said bottom face, said fibers being discharged through said slots and into discharge conveying means 18, said rotor having a drivable shaft 29 secured to a displaceable suspension mechanism 45 to displace said rotor and consequently said blades of said rotor above said grill a variable distance depending on the resistive load applied to said blades of said rotor when a bale of hay is displaced over said grill, electric motor means 66, 67 coupled to said drivable shaft for rotating same, said displaceable suspension mechanism 45 having pressure biasing means 50 and 280 having a predetermined biasing pressure value, said cutting knives being displaced to retract within said slots when said predetermined biasing pressure value is exceeded by the load on said cutting blades of said rotor whereby said electric motor means maintains a substantially constant drive torque on said rotor drivable shaft and a substantially constant speed of rotation of said rotor.

2. A hay bale processor as claimed in claim 1 wherein said pressure biasing means 50 is a pressure cylinder producing a substantially constant biasing force on said drivable shaft 29 in the direction of said grill.

3. A hay bale processor as claimed in claim 2 wherein said pressure cylinder 50 is an air pressure cylinder.

4. A hay bale processor as claimed in claim 3 wherein said displaceable suspension mechanism 45 comprises a pair of pivotal arms 46, 46' each having a fixed pivot end 48, said drivable shaft 29 being supported adjacent opposed ends of said drivable shaft by a respective one of said pivotal arms, said air cylinder 50 having a piston rod 51 with a piston rod end 52 thereof secured to one of said pivotal arms 46 and applying said substantially constant upward biasing force on said one of said pivotal arms.

5. A hay bale processor as claimed in claim 4 wherein said pressure cylinder 50 is secured to a pressurized air reservoir 80, a compressor 83 to supply compressed air to said reservoir, a pressure regulator 81 to adjust the air pressure in said reservoir, said pressure regulator 81 adjusting said predetermined pressure value on said pivotal arm 46 and drivable shaft supported thereby dependent on the rating of said electric motor means 66, 67 to maintain said substantially constant drive torque.

6. A hay bale processor as claimed in claim 4 wherein said rotor drivable shaft 29 is provided with a plurality of blade support discs 30 secured in equidistantly spaced relationship along said drivable shaft, said discs 30 having blade attachment shoulders 32, each shoulder having a pair of spaced holes 33 to receive fasteners to secure a cutting blade 35 thereto, said blades each having at least one cutting edge 36 angulated to an apex 37 thereof, said pair of spaced holes providing for said blade to be attached to said attachment shoulders with said apex lying substantially on a diametrical axis 39 of said support disc, and a further hole 33' disposed below a trailing one of said pair of spaced holes to secure said blades 36' slanted rearwardly of said diametrical axis.

7. A hay bale processor as claimed in claim 4 wherein there is further provided arresting means to limit the displacement of said pair of pivotal arms to position said cutting blades from a retracted position below said slot openings of said grill and a maximum working position wherein said blades project above said slot openings a maximum distance, said arresting means being constituted by a guide slot 67 in a side wall 12 of a support framework 11 under said container means 14 and through which extends said drivable shaft of said rotor.

8. A hay bale processor as claimed in claim 4 wherein a driven pulley 65 is secured to an extension end of one of said opposed ends of said drivable shaft extending through its associated pivotal arm 46, said electric motor means being an electric motor 66 having a drive shaft 69, a drive pulley 68 secured to said drive shaft, a drive belt 70 about said driven pulley and drive pulley to impact axial rotation to said driven pulley, and automatically adjustable tension means 72 to maintain said drive belt taut when said driven shaft is displaced when said predetermined biasing pressure value is exceeded by the load on said cutting blades.

9. A hay bale processor as claimed in claim 8 wherein said driven pulley 65 is a double sheave pulley, there being two of said electric motors 66, 67, each motor having an associated one of said belt 70, 71 trained about an associated one of said double sheaves 65, said automatically adjustable tension means being constituted by a floating pulley 72, 73 which is spring biased against a portion of said drive belt 70, 71 of each motor and between said double sheave pulley and drive pulley.

10. A hay bale processor as claimed in claim 4 wherein the other pivotal arm 46' is provided with a piston 53 secured to a free end 55 thereof to remove vibration and to stabilize said drivable shaft 29 of said rotor.

11. A hay bale processor as claimed in claim 4 wherein one of said pivotal arms 46, 46' is provided with adjustable arresting means 57, 58, 59 to limit the displacement of said pair of pivotal arms to position said cutting blades from a retracted position below said slot openings of said grill and a maximum working position wherein said blades project above said slot openings a maximum distance.

12. A hay bale processor as claimed in claim 11 wherein said adjustable arresting means is constituted by a pair of abutment members 58, 59 positioned spaced from one another and disposed on opposed sides of a free end portion of said one of said pivotal arms 46, 46', at least one of said abutment members 59 having an adjustable abutment face 62' disposed to define said maximum distance.

13. A hay bale processor as claimed in claim 3 wherein said spaced-apart slot openings 27 are elongated rectangular slot openings, said openings having adjustable means 90 to vary the width of each said slot simultaneously.

14. A hay bale processor as claimed in claim 1 wherein said adjustable means 90 is provided by at least one displaceable plate 85 having elongated rectangular slot openings 27 therein which are spaced apart a predetermined distance and defining obstructing wall sections between said slot openings, said at least one displaceable plate 85 being retained in frictional contact under uppermost-like slot openings, said displaceable plate being displaceable to register its slot openings 27 with said uppermost-like slot openings 27' or to obstruct a portion of said uppermost slot openings by said obstructing wall sections whereby to adjust the width of said slots and thereby said average fiber cut length.

15. A hay bale processor as claimed in claim 1 wherein said grill is constituted by a rectangular opening 24 in said bottom wall 23, there being provided two of said displaceable plates 85, 87, said plates being rectangular plates held under said rectangular opening and disposed in frictional contact with one another and with a bottom face 88 of said bottom wall 23 of said container means, a displaceable linkage 90 secured to said displaceable plates to displace both said plates with respect to one another whereby to vary the width of each said slots simultaneously.

16. A hay bale processor as claimed in claim 15 wherein said displaceable linkage 90 comprises an actuating arm 91 secured adjacent one end to a stationary pivot 93, a pair of link arms 94, 95 each secured to a respective one of a pivot connection 96, 97 on said actuating arm and disposed on opposed sides of said stationary pivot, said pair of link arms 94, 95 being secured at their other end to a respective one of said two displaceable plates, and a lever 98 secured at the other end of said actuating arm to displace said actuating arm a limited distance about said stationary pivot.

17. A hay bale processor as claimed in claim 16 wherein said lever 98 extends through a slot 99 provided in said bottom wall 23, said slot defining between opposed ends thereof said limited distance.

18. A hay bale processor as claimed in claim 17 wherein said lever has an engageable end 100 associated with a grid 101 defining a range of said average fiber cut lengths to permit a user person to select a desired average fiber cut length.

19. A hay bale processor as claimed in claim 1 wherein said container means is a circular drum 14 supported elevated on a support frame, said drum having a cylindrical wall 16 rotatable over a top wall of said support frame and which constitutes said bottom wall of said container means, support guide means 105 maintaining said cylindrical wall 16 in a constant peripheral vertical guide plane, said drum being rotated by an endless belt 110 trained about belt engagement means 111 secured about a lower portion of said cylindrical wall 16 and a drive sheave 113.

20. A hay bale processor as claimed in claim 19 wherein said cylindrical wall 19 is provided on an inner wall surface thereof with two or more of said bale displacement means 140 for engaging a bale of hay 156, 157 and displacing said bale over said grill 26.

21. A hay bale processor as claimed in claim 20 wherein said bale displacement means is constituted by vertically hinged bale engaging fins 140 secured vertically to said inner wall surface 16' by hinge means 141, 142, said bale engaging fins each having a sloped outer edge 144 sloping outwardly and inwards in said tub from a top end to a bottom end, said fins being displaceable towards said inner wall surface 16' on one side of said hinge means when displaced by a bale of hay when inserted in said tub and engaging said bale of hay by stopper means 147 which arrest said fins from displacement against an opposed side of said hinge, said opposed sides trailing the direction of rotation 146 of said tub.

22. A hay bale processor as claimed in claim 21 wherein said stopper means 147 is an angulated reinforcing plate secured to each said fins at a lower wide end portion thereof, said reinforcing plate 147 abutting said inner wall surface 16' on said opposed side of said hinge means.

23. A hay bale processor as claimed in claim 21 wherein said bale engaging fins are provided with attachment means 149 to provide for attachment of fin extension plates 150.

24. A hay bale processor as claimed in claim 19 wherein said cylindrical wall is provided with sighting windows 151 to view the interior of said tub.

25. A hay bale processor as claimed in claim 19 wherein said bottom wall of said tub is provided with at last one arcuate guide rib 155 projecting upwardly from a top surface of said bottom wall 23, said arcuate guide rib 155 being disposed upstream of said grill whereby to shift said bale 160 being displaced over said grill to prevent the formation of cut-out channels 158 in said lower surface 159 of said bale by said cutting blades.

26. A hay bale processor as claimed in claim 25 wherein there are two or more of said arcuate guide ribs 155 disposed spaced-apart in substantially parallel relationship, each rib having a top edge 160 sloping upwardly from a front end 161 to a rear end 162 thereof, said rear end 162 being disposed adjacent said grill.

27. A hay bale processor as claimed in claim 19 wherein said cylindrical wall has at least a wall portion thereof being a hinged wall portion 170 for access to the interior of said circular drum 14.

28. A hay bale processor as claimed in claim 19 wherein said top wall 15 of said support frame 12 is a rectangular top wall, said top wall being hinged to said frame, and a piston 21 actuable to hinge said top wall and said circular drum upwardly on a hinge connection 20 to provide access below said top wall and to said grill.

29. A hay bale processor as claimed in claim 19 wherein said drive sheave 113 is a gear box drive sheave driven by a variable speed drive.

30. A hay bale processor as claimed in claim 29 wherein said variable speed drive is constituted by a variable drive sheave 116, a variable tension drive belt 117 trained about said variable drive sheave and a drivable sheave 115 of said gear box, and drive belt tensioning means 118, 120 to vary the circumference of said variable drive sheave and the speed of rotation of said drivable sheave of said gear box.

31. A hay bale processor as claimed in claim 30 wherein said drive belt tensioning means is constituted by at least one displaceable sheave 118 biased against said variable tension drive belt 117 by a linkage 120, said linkage 120 being actuable to displace said displaceable sheave by a control arm 121 engageable at one of two or more arm engaging positions 122, each said arm engaging position applying a different tension on said drive belt to cause said gear box drive sheave to rotate at a different speed whereby said cylindrical side wall 16 of said drum 14 may be rotated at different speeds.

32. A hay bale processor as claimed in claim 31 wherein said variable drive sheave 116 is driven by said electric motor means 66.

33. A hay bale processor as claimed in claim 32 wherein said electric motor means 66 is coupled to an auger screw drive shaft 133 located in a discharge trough under said rotor and constituting said discharge conveying means, said variable drive sheave 116 being secured to a free end of said auger screw drive shaft 33.

34. A hay bale processor as claimed in claim 1 wherein said bale of hay is a circular bale of dry hay.

35. A hay bale processor as claimed in claim 1 in combination an animal feed mixer 180, said discharge conveying means having a discharge port, said discharge port having a coupling flange 181 to removably secure a connecting conduit 182 thereto and to a fiber feeding inlet port 183 of said animal feed mixer for mixing said fibers of average cut length with other animal feed products 186.

* * * * *